United States Patent
Kokubo et al.

(10) Patent No.: US 9,264,854 B2
(45) Date of Patent: Feb. 16, 2016

(54) CONTENT SELECTION SYSTEM, CONTENT SELECTION METHOD AND MANAGEMENT APPARATUS

(71) Applicants: Atsushi Kokubo, Kanagawa (JP); Ryouji Yamamoto, Kanagawa (JP); Hiroshi Kobayashi, Kanagawa (JP); Eiichiro Yoshida, Kanagawa (JP); Yuki Takaya, Kanagawa (JP)

(72) Inventors: Atsushi Kokubo, Kanagawa (JP); Ryouji Yamamoto, Kanagawa (JP); Hiroshi Kobayashi, Kanagawa (JP); Eiichiro Yoshida, Kanagawa (JP); Yuki Takaya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/473,080

(22) Filed: Aug. 29, 2014

(65) Prior Publication Data
US 2015/0065175 A1 Mar. 5, 2015

(30) Foreign Application Priority Data

Aug. 30, 2013 (JP) ................................. 2013-179024
Jul. 28, 2014 (JP) ................................. 2014-152793

(51) Int. Cl.
*H04W 24/00* (2009.01)
*H04W 4/02* (2009.01)
*H04W 64/00* (2009.01)

(52) U.S. Cl.
CPC ................ *H04W 4/02* (2013.01); *H04W 64/00* (2013.01)

(58) Field of Classification Search
CPC ................................ H04W 4/02; H04W 64/00
See application file for complete search history.

(56) References Cited

U.S. PATENT DOCUMENTS

| | | | |
|---|---|---|---|
| 8,249,914 B2 | 8/2012 | Umeda | |
| 8,280,398 B2 | 10/2012 | Ishii et al. | |
| 8,819,254 B2 * | 8/2014 | Story | 709/229 |
| 2002/0129371 A1 * | 9/2002 | Emura et al. | 725/61 |
| 2007/0038950 A1 * | 2/2007 | Taniguchi et al. | 715/768 |
| 2011/0164188 A1 * | 7/2011 | Karaoguz et al. | 348/734 |
| 2014/0019867 A1 * | 1/2014 | Lehtiniemi et al. | 715/738 |
| 2015/0016675 A1 * | 1/2015 | Kishi | 382/103 |

FOREIGN PATENT DOCUMENTS

| | | |
|---|---|---|
| JP | 2005-158007 | 6/2005 |
| JP | 2010-159980 | 7/2010 |
| JP | 4620410 | 1/2011 |
| JP | 5056009 | 10/2012 |
| WO | 2005/086375 A1 | 9/2005 |

\* cited by examiner

*Primary Examiner* — Erin File
(74) *Attorney, Agent, or Firm* — Oblon, McClelland, Maier & Neustadt, L.L.P.

(57) ABSTRACT

A content selection system, in which a management apparatus, a distribution apparatus and a wireless terminal are provided, includes the distribution apparatus's distribution unit for distributing, within a predetermined spatial range, location information indicating a location at which the distribution apparatus is installed; the wireless terminal's obtaining unit for obtaining the location information distributed by the distribution unit; the wireless terminal's transmission unit for transmitting the obtained location information to the management apparatus; the management apparatus's reception unit for receiving the transmitted location information; the management apparatus's determination unit configured to determine whether the received location information indicates a predetermined location; and the management apparatus's selection unit for selecting a content associated with the predetermined location for output thereat in response to the determination by the determination unit that the received location information indicates the predetermined location.

8 Claims, 29 Drawing Sheets

FIG.7

| NAME OF EXHIBIT | LATITUDE | LONGITUDE | FLOOR |
|---|---|---|---|
| DRAWING 1 | 35.46100 | 139.38090 | 1 |
| DRAWING 2 | 35.46100 | 139.38095 | 1 |
| : | : | : | : |

FIG.8

| NUM-BER | NAME OF EXHIBIT | CONTENT ID | AGE | GENDER | NATION-ALITY | BIRTH-PLACE | OCCU-PATION | VISUAL ACUITY | COLOR BLIND | BLIND | HEAR-ING LOSS | PERCEP-TION OF LIGHT |
|---|---|---|---|---|---|---|---|---|---|---|---|---|
| 1 | DRAWING 1 | pic1_jp_default | * | * | * | * | * | * | * | * | * | * |
| 2 | DRAWING 1 | pic1_jp_large | 61 OR OLDER | * | * | * | * | LOWER THAN 0.3 | * | * | * | * |
| 3 | DRAWING 1 | pic1_us | * | * | US | * | * | * | * | * | * | * |
| .. | .. | .. | .. | .. | .. | .. | .. | .. | .. | .. | .. | .. |
| 11 | DRAWING 2 | pic2_with_adv_default | * | * | * | * | * | * | * | * | * | * |
| 12 | DRAWING 2 | pic2_with_adv_IT | * | * | * | * | IT | * | * | * | * | * |
| 13 | DRAWING 2 | pic2_with_adv_med | * | * | * | * | Medical | * | * | * | * | * |
| 14 | DRAWING 2 | pic2_soundonly_jp | * | * | JP | * | * | * | * | Y | * | * |
| 15 | DRAWING 2 | pic2_soundonly_eng | * | * | US | * | * | * | * | Y | * | * |
| .. | .. | .. | .. | .. | .. | .. | .. | .. | .. | .. | .. | .. |

FIG.9

| IDENTIFICATION INFORMATION | LATITUDE | LONGITUDE | FLOOR | RECEPTION DATE AND TIME |
|---|---|---|---|---|
| 0123456720001 | 35.46100 | 139.38090 | 1 | 2013/7/1 16:00:00 |
| 0123456720002 | 35.46100 | 139.38095 | 1 | 2013/7/1 16:00:03 |
| 0123456720003 | 35.46100 | 139.38095 | 1 | 2013/7/1 16:00:02 |
| 0123456720004 | 35.46100 | 139.38095 | 1 | 2013/7/1 16:00:01 |
| ⋮ | ⋮ | ⋮ | ⋮ | ⋮ |

FIG.10

| IDENTIFICATION INFORMATION | AGE | GENDER | NATION-ALITY | BIRTH-PLACE | OCCU-PATION | VISUAL ACUITY | COLOR BLIND | BLIND | HEARING LOSS | PERCEPTION OF LIGHT |
|---|---|---|---|---|---|---|---|---|---|---|
| 0123456720001 | 25 | M | JP | Yokohama | IT | 0.2 | N | N | N | N |
| 0123456720002 | 26 | F | US | New York | Medical | 0.01 | N | Y | N | N |
| ⋮ | ⋮ | ⋮ | ⋮ | ⋮ | ⋮ | ⋮ | ⋮ | ⋮ | ⋮ | ⋮ |

FIG.11

| FLOOR | LATITUDE | LONGITUDE | BUILDING NUMBER |
|---|---|---|---|
| 1 | 35.46100 | 139.38090 | 2 |

FIG.12

| AGE | GENDER | NATIONALITY | BIRTHPLACE | OCCUPATION | VISUAL ACUITY | COLOR BLIND | BLIND | HEARING LOSS | PERCEPTION OF LIGHT |
|---|---|---|---|---|---|---|---|---|---|
| 25 | M | JP | Yokohama | IT | 0.2 | N | N | N | N |

CONTENT SELECTION SYSTEM, CONTENT SELECTION METHOD AND MANAGEMENT APPARATUS

BACKGROUND OF THE INVENTION

1. Field of the Invention

The disclosures herein generally relate to a content selection system, a content selection method and a management apparatus.

2. Description of the Related Art

There is a system in museums, galleries or the like which provides content related to exhibits by way of audio and video. Visitors can obtain more information about an exhibit by viewing reproduced content through, for example, a speaker or a display which is placed near the exhibit. In general, these kinds of content are continuously being reproduced near the exhibits or the reproduction of content is started by a visitor's manual operation. Also, a visitor may be able to select content to be reproduced according to the language used by the visitor.

In the meantime, various location information management systems which obtain a location of a person or a wireless terminal indoors are proposed. In Patent Document 1, a system in which a location of a person is obtained by putting a passive-method wireless tag on a person and reading the wireless tag through a fixed wireless tag reader/writer is disclosed. In Patent Document 2, a system is disclosed in which a wireless terminal determines its location by converting an identifier wirelessly transmitted from a nearby transmitter to location identification information. In Patent Document 3, a system is disclosed in which a location of a wireless terminal is identified by causing the wireless terminal to receive unique information transmitted from an illuminating device, and to transmit the unique information to a server through a predetermined access point.

There is a requirement for starting reproduction of content at the timing when a visitor arrives at a predetermined location where an exhibit or the like is located. Also, it is desirable to provide appropriate content according to an attribute such as the language used by the visitor.

[Patent Document 1] Japanese Patent No. 4620410
[Patent Document 2] Japanese Patent Application Publication No. 2010-159980
[Patent Document 3] International Publication WO2005/086375

SUMMARY OF THE INVENTION

It is a general object of at least one embodiment of the present invention to make it possible to output appropriate content according to an attribute of a person who has reached a predetermined location in order to solve problems of the existing technology.

In order to solve the above problems and achieve the objective, a content selection system according to an embodiment of the present invention is a system in which a management apparatus, a distribution apparatus and a wireless terminal are provided. The system includes a distribution unit, disposed in the distribution apparatus, configured to distribute, within a predetermined spatial range, location information indicating a location at which the distribution apparatus is installed; an obtaining unit, disposed in the wireless terminal, configured to obtain the location information distributed by the distribution unit within the predetermined spatial range; a transmission unit, disposed in the wireless terminal, configured to transmit the location information obtained by the obtaining unit to the management apparatus; a reception unit, disposed in the management apparatus, configured to receive the location information transmitted by the transmission unit; a determination unit, disposed in the management apparatus, configured to determine whether the location information received by the reception unit indicates a predetermined location; and a selection unit, disposed in the management apparatus, configured to select a content associated with the predetermined location for output thereat in response to the determination by the determination unit that the location information indicates the predetermined location.

According to the present invention, it is possible to output appropriate content according to an attribute of a person who has reached a predetermined location.

BRIEF DESCRIPTION OF THE DRAWINGS

Other objects and further features of embodiments will become apparent from the following detailed description when read in conjunction with the accompanying drawings, in which:

FIG. 7 is a drawing illustrating an example of a table which stores exhibit information;

FIG. 8 is a drawing illustrating an example of a table which stores content information;

FIG. 9 is a drawing illustrating an example of a table which stores location information;

FIG. 10 is a drawing illustrating an example of a table which stores attribute information;

FIG. 11 is a drawing illustrating an example of location information stored in the distribution apparatus;

FIG. 12 is a drawing illustrating an example of attribute information stored in the wireless terminal;

DESCRIPTION OF THE PREFERRED EMBODIMENTS

In the following, embodiments of the present invention will be described with reference to the accompanying drawings.

1. System Overview
2. Hardware Configuration
2.1 Management Apparatus
2.2 Wireless Terminal
2.3 Distribution Apparatus
3. Functions
3.1 Distribution Apparatus
3.2 Wireless Terminal
3.3 Management Apparatus
4. Operation Examples
4.1 Location Information and Attribute information Obtaining Process
4.2 Content Selection Process (Process Flow)
4.3 Content Selection Process (Operation Examples)
5. Specific Examples of Content Selection

1. SYSTEM OVERVIEW

Figure 1:
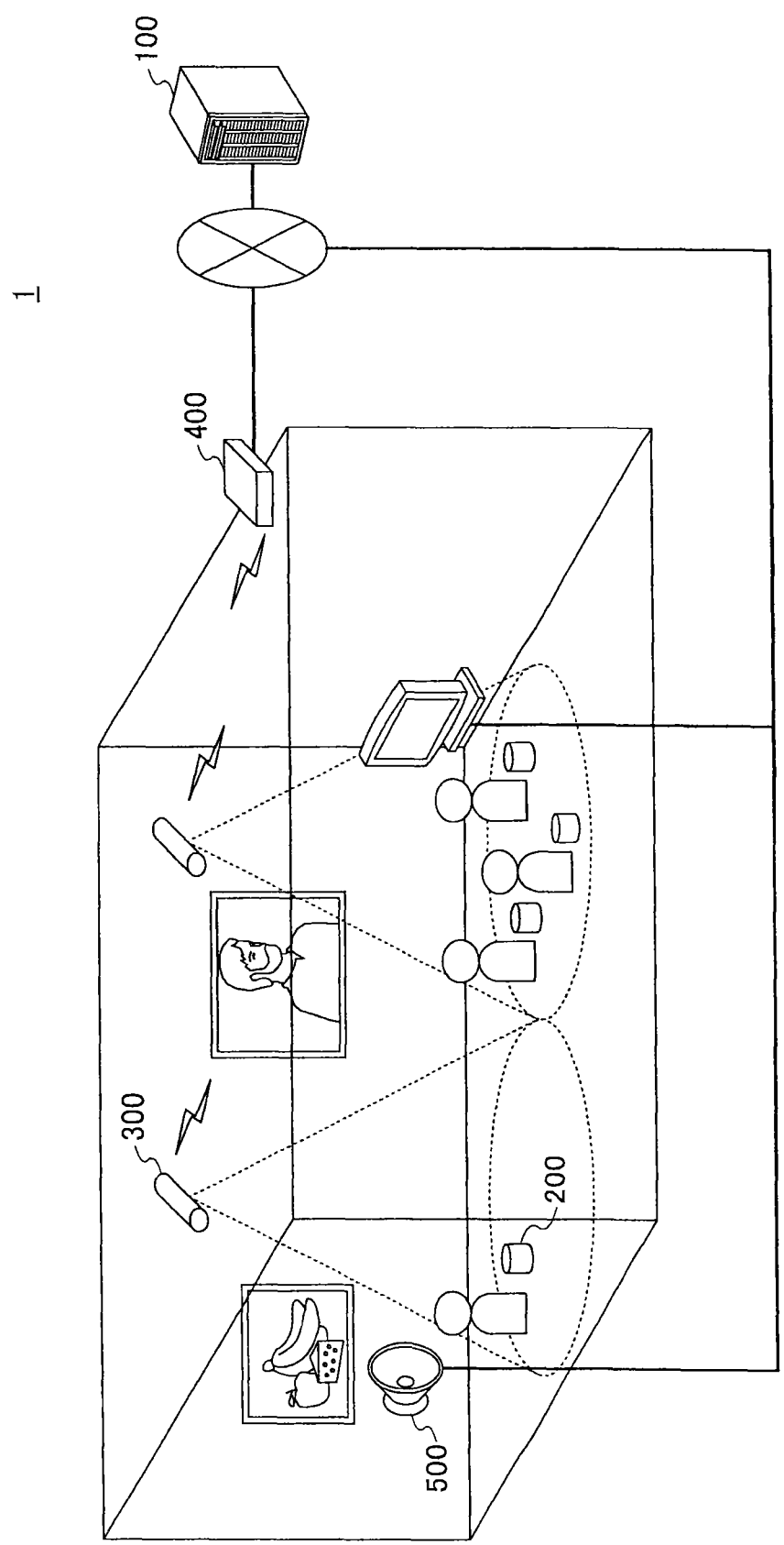
FIG. 1 is a schematic diagram of a content selection system in an embodiment of the present invention.

FIG. 1 is a schematic diagram of a content selection system 1 in an embodiment of the present invention. In FIG. 1, a state of the inside of an art museum is depicted. Inside of the museum, together with exhibits such as paintings, output equipment 500 which outputs content related to the exhibits is installed. The output equipment 500 is, for example, a speaker or a display. The output equipment 500 outputs content with audio or video according to instructions from a management apparatus 100 installed in other area.

Also, inside of the museum, a distribution apparatus 300 is installed which transmits a positioning signal according to IMES (Indoor Messaging System) Standard which is a standard related to positioning technology for indoors. The distribution apparatus 300 is provided, for example, as a built-in distribution apparatus in a lighting fixture installed on the ceiling. The distribution apparatus 300 distributes information of a location at which the distribution apparatus 300 is installed, in a range indicated by a dotted line in FIG. 1. Also, the distribution apparatus 300 forms a wireless network together with a gateway 400 which is separately installed inside the museum. The wireless network is formed by using, for example, ZigBee (registered trademark) or Bluetooth (registered trademark).

A visitor who appreciates exhibits has a wireless terminal 200 in which unique attributes of the visitor (e.g., age, gender) are recorded. The wireless terminal 200 may receive the positioning signal transmitted by the distribution apparatus 300 and obtains location information. Also, the wireless terminal 200 may participate in the network formed by the distribution apparatus 300 and the gateway 400. The wireless terminal participating in the network transmits the location information obtained from the distribution apparatus 300 and the attribute information recorded in advance to the management apparatus 100 via the distribution apparatus.

On the other hand, the management apparatus 100 indicated in an area different from a room of the art museum shown in FIG. 1 is capable of communicating with the gateway via LAN, etc., and collects the location information and the attribute information transmitted by the wireless terminal 200. When the location information transmitted by the wireless terminal 200 indicates a location which is the same as (or near) the exhibit, the management apparatus 100 can instruct the output equipment 500 to output the content in accordance with the attribute information of the wireless terminal 200. For example, in the case where a wireless terminal 200 possessed by an elderly person is located near a certain exhibit, the management apparatus 100 selects content which uses bigger letters or content whose audio reproduction speed is slower and causes the output equipment 500 to output the content.

In this way, the content selection system 1 in an embodiment of the present invention can collect location information and attribute information of visitors through, for example, the distribution apparatus installed on the ceiling indoors.

Figure 2:
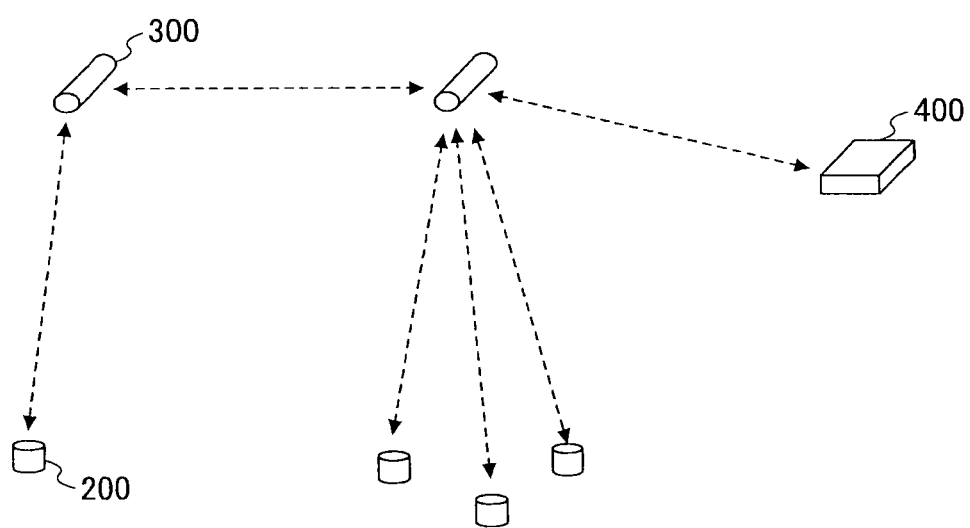
FIG. 2 is a schematic diagram of a wireless network which configures the content selection system.

FIG. 2 shows the gateway 400, the distribution apparatus 300 and the wireless terminal 200 which form the wireless network in FIG. 1 and are extracted from FIG. 1. For example, in the case where the wireless network is configured by ZigBee, the gateway 400 may function as a ZigBee coordinator which activates and manages the wireless network. Also, the distribution apparatus 300 may function as a ZigBee router which functions as a relay node, and the wireless terminal 200 may function as a ZigBee end device which transmits data.

2. HARDWARE CONFIGURATION

Next, using FIG. 3 through FIG. 5, hardware configurations of the management apparatus 100, wireless terminal 200 and the distribution apparatus 300 in an embodiment of the present invention will be described.

(2.1 Management Apparatus)

Figure 3:
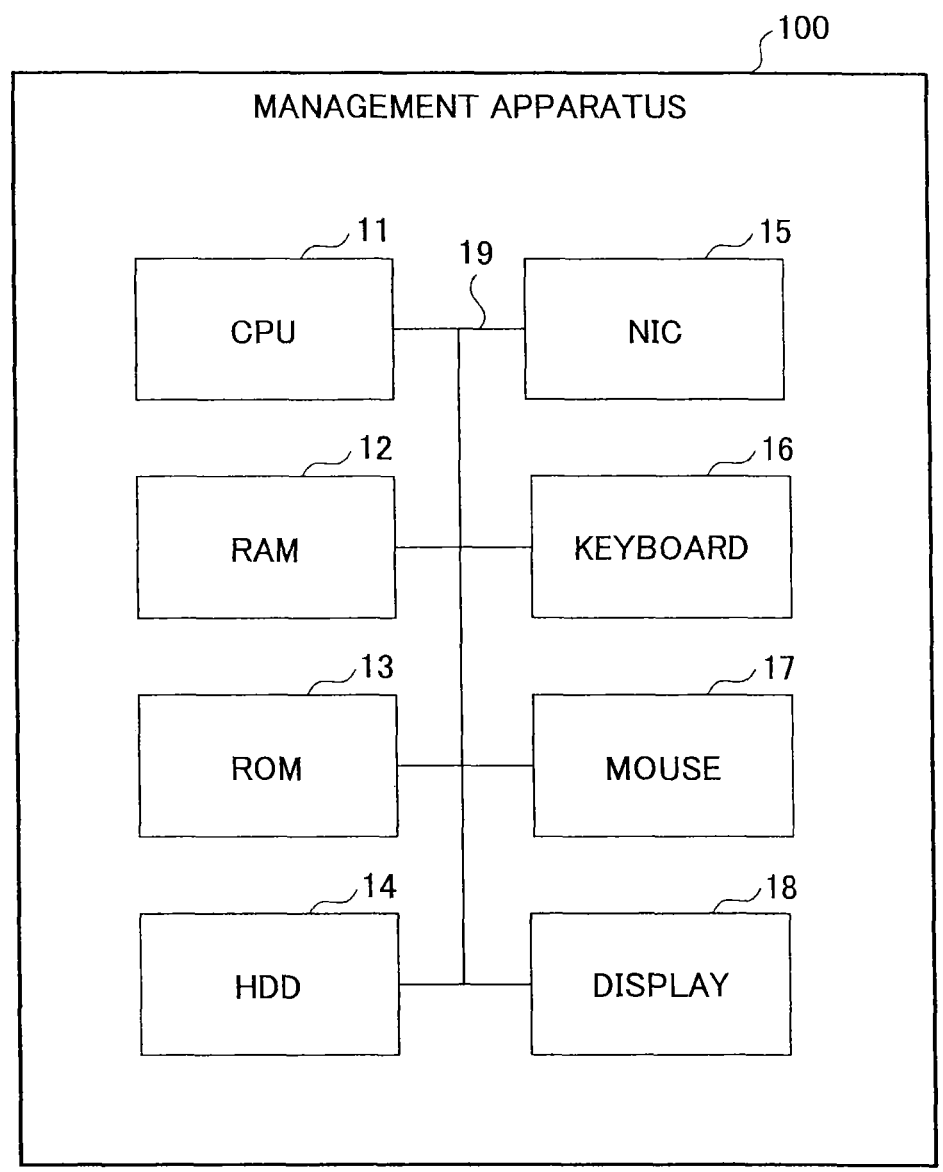
FIG. 3 is a hardware configuration of a management apparatus in an embodiment of the present invention.

FIG. 3 shows an example of a hardware configuration of the management apparatus 100 in an embodiment of the present invention. The management apparatus 100 includes a CPU 11, a RAM 12, a ROM 13, an HDD 14, a NIC (Network Interface Card) 15, a keyboard 16, a mouse 17 and a display 18.

The CPU 11 executes a program which controls operations of the management apparatus 100. The RAM 12 configures a work area of the CPU 11. The ROM 13 stores system programs of the management apparatus 100 or the like. The HDD 14 stores location information and attribute information received from wireless terminals 200, exhibit information indicating the location of the exhibit, content information related to the content to be output, etc., in addition to applications, user data, etc. The NIC 15 is a NIC for connecting to the LAN. The keyboard 16 and the mouse 17 are input devices which accept operational inputs from a manager, etc., of the management apparatus 100. The display 18 is a device for presenting information to the manager, etc., of the management apparatus 100. A bus 19 electrically connects the apparatuses described above.

According to the configurations described above, the management apparatus 100 in an embodiment of the present invention can select content in accordance with the attributes of the visitor who is near the exhibit, and cause the output equipment to output the content.

(2.2 Wireless Terminal)

Figure 4:
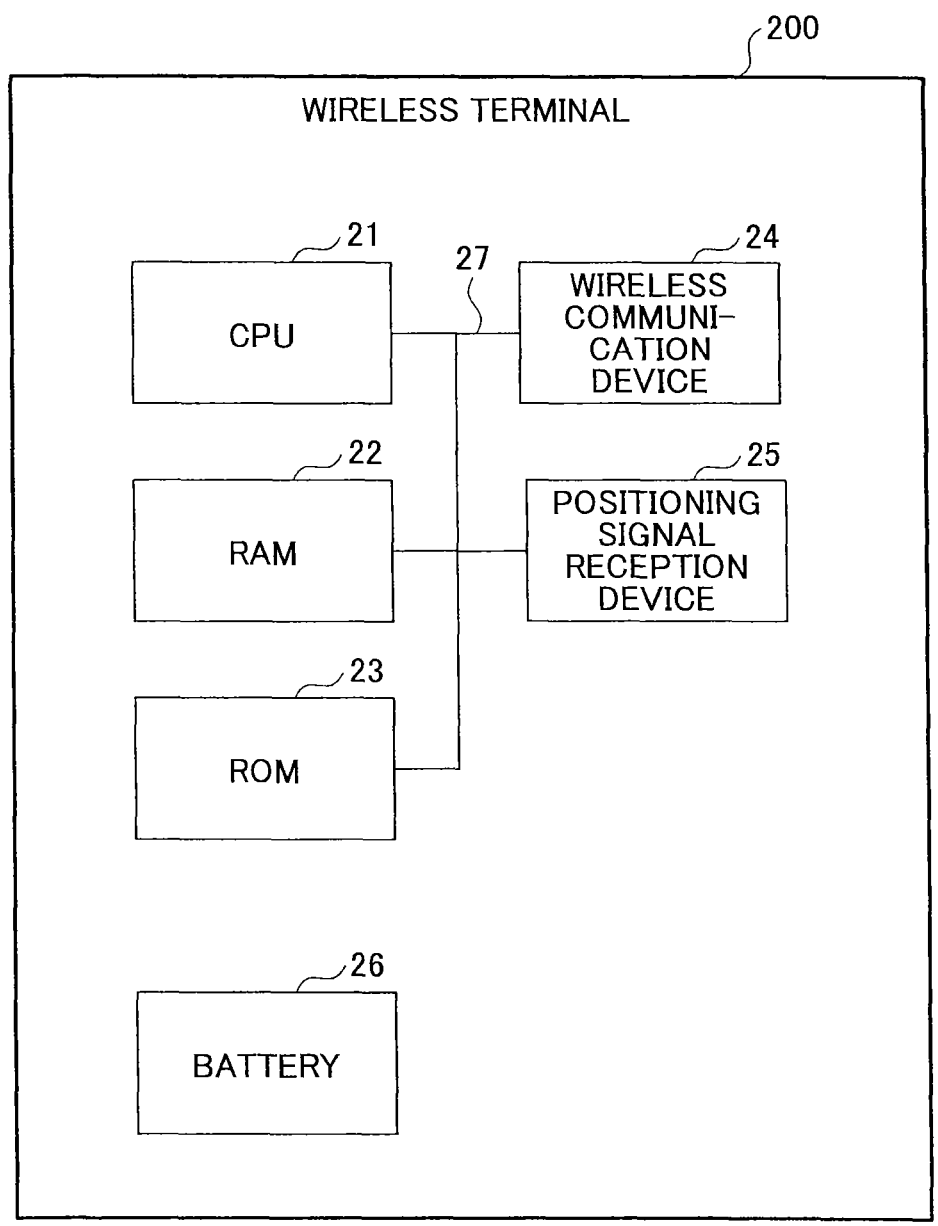
FIG. 4 is a hardware configuration of a wireless terminal in an embodiment of the present invention.

FIG. 4 shows a hardware configuration of a wireless terminal 200 in an embodiment of the present invention. The wireless terminal 200 includes a CPU 21, a RAM 22, a ROM 23, a wireless communication device 24, a positioning signal reception device 25 and a battery 26. The wireless terminal 200 may be provided in a form of a small tag or provided as a built-in wireless terminal in a mobile telephone.

The CPU 21 executes a program which controls operations of the wireless terminal 200. The RAM 22 configures a work area of the CPU 21. The ROM 23 stores a system program of the wireless terminal 200, identification information of the wireless terminal 200, attribute information written in the wireless terminal 200 in advance, or the like. The wireless communication device 24 is a device for communicating with the distribution apparatus 300 or the gateway 400 using, for example, ZigBee (registered trademark) or Bluetooth (registered trademark) or the like. It should be noted that a plurality of any kinds of wireless communication devices 24 may be included. The positioning signal reception device 25 is a device for receiving a positioning signal configured in accordance with, for example, GPS or IMES standards, and obtaining the location information. The battery 26 provides power for driving the wireless terminal 200. A bus 27 electrically connects other devices or circuits except for the battery 26.

According to the configuration described above, the wireless terminal 200 in an embodiment of the present invention can receive location information distributed by the distribution apparatus 300. Also, the wireless terminal 200 can transmit the received location information and the attribute information written in advance to the management apparatus 100 through the distribution apparatus 300 and the gateway 400.

(2.3 Distribution Apparatus)

Figure 5:
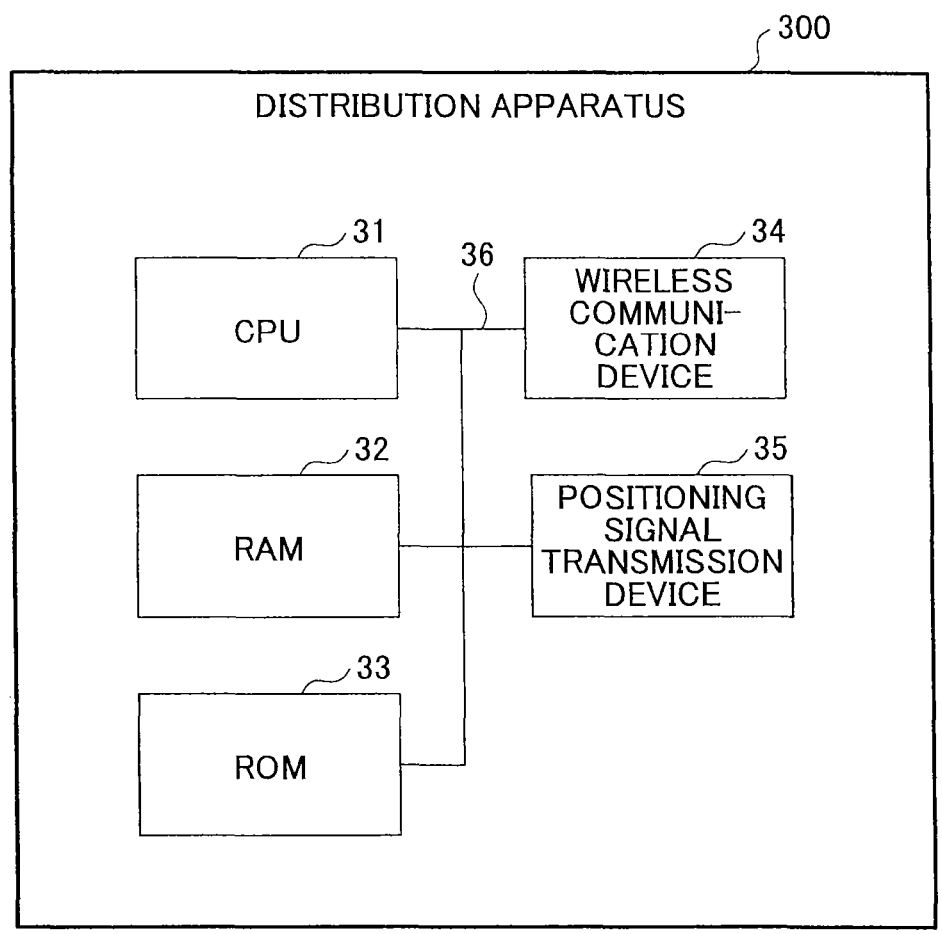
FIG. 5 is a hardware configuration of a distribution apparatus in an embodiment of the present invention.

FIG. 5 shows an example of a hardware configuration of the distribution apparatus 300 in an embodiment of the present invention. The distribution apparatus 300 includes a CPU 31, a RAM 32, a ROM 33, a wireless communication device 34 and a positioning signal transmission device 35.

The CPU 31 executes a program which controls operations of the distribution apparatus 300. The RAM 32 configures a work area, etc., of the CPU 31. The ROM 33 stores location information indicating a location at which the distribution apparatus is installed in addition to the program the CPU 31 executes and data necessary for the execution of the program. The wireless communication device 34 is a device for communicating with the wireless terminal 200 and the gateway 400 using, for example, ZigBee (registered trademark) or Bluetooth (registered trademark), etc. The positioning signal transmission device 35 is a device which transmits a positioning signal configured in accordance with, for example, GPS or IMES standards. A bus 36 electrically connects the above devices.

According to the configuration described above, the distribution apparatus 300 in an embodiment of the present invention can distribute the location information to the wireless terminal 200. Also, the distribution apparatus 300 can relay the location information and the attribute information received from the wireless terminal 200 to the management apparatus 100.

3. FUNCTIONS

Figure 6:
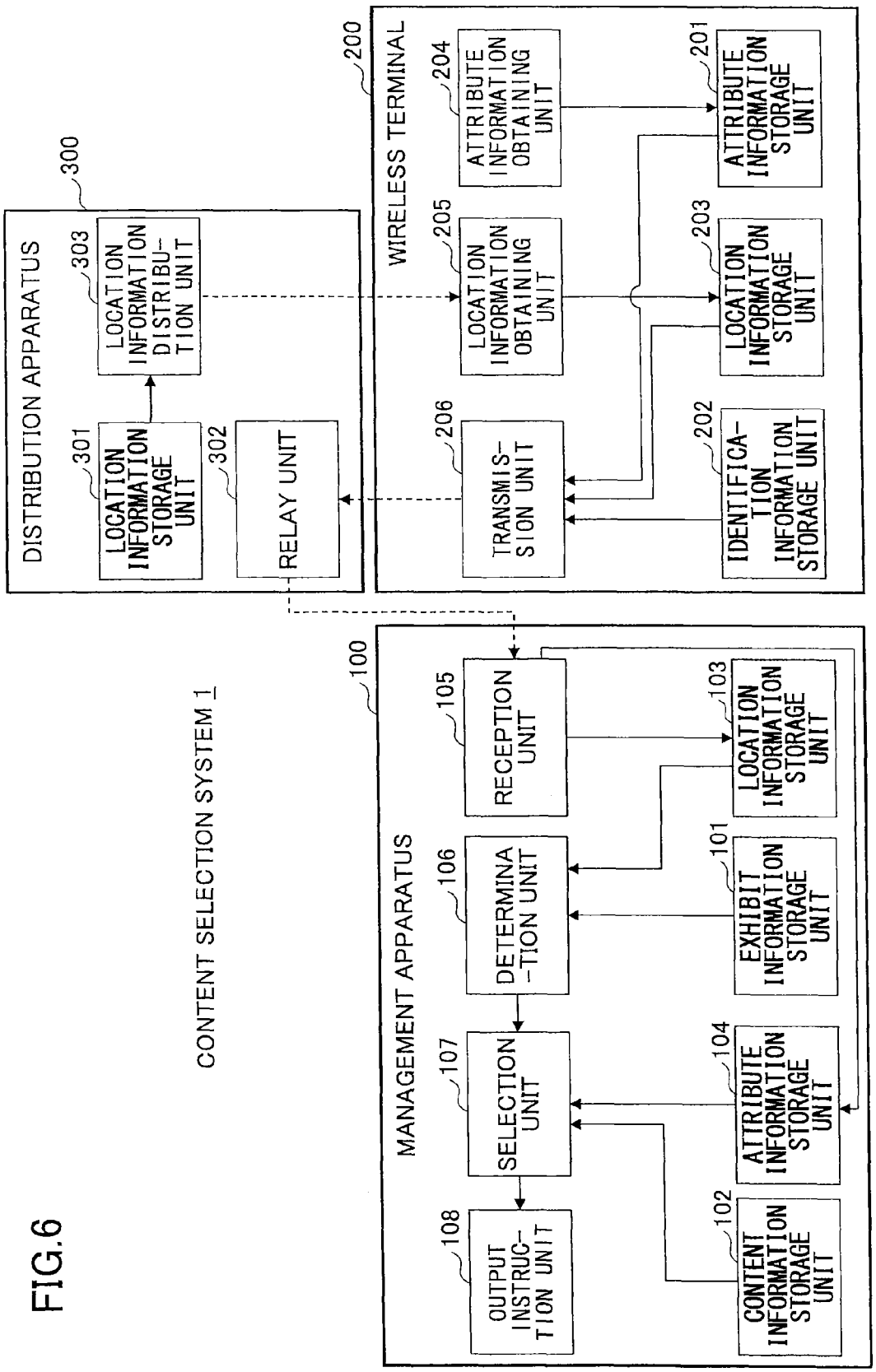
FIG. 6 is a functional block diagram of the content selection system in an embodiment of the present invention.

Next, referring to FIG. 6, functional block configurations of the management apparatus 100, wireless terminal 200 and the distribution apparatus 300 in an embodiment of the present invention will be described. In FIG. 6, of various elements these apparatuses include, elements specifically related to the description of the embodiment are shown.

(3.1 Distribution Apparatus)

The distribution apparatus in an embodiment of the present invention includes a location information storage unit 301, a relay unit 302 and a location information distribution unit 303.

The location information storage unit 301, which is realized by the ROM 33 shown in FIG. 5, stores location information indicating a location at which the distribution apparatus 300 is installed. The location information includes, for example, information of a floor, a latitude, a longitude and a building number.

The relay unit 302, which is realized by processes of the CPU 31 and the wireless communication device 34 shown in FIG. 5, relays information received from the wireless terminal 200 (identification information, location information and attribute information) to other distribution apparatuses 300 or the gateway 400.

The location information distribution unit 303, which is realized by processes of the CPU 31 and the positioning signal transmission device 35 shown in FIG. 5, distributes the location information stored in the location information storage unit 301 within the predetermined range. The location information distribution unit 303 can distribute the location information using, for example, a frame of IMES standard.

(3.2 Wireless Terminal)

The wireless terminal 200 in an embodiment of the present invention includes an attribute information storage unit 201, an identification information storage unit 202, a location information storage unit 203, an attribute information obtaining unit 204, a location information obtaining unit 205 and a transmission unit 206.

The attribute information storage unit 201, which is realized by the ROM 23 shown in FIG. 4, stores attribute information written in advance by an external apparatus. The attribute information includes, for example, items shown in FIG. 12. Of items shown in FIG. 12, items of age, gender, nationality, birthplace, occupation and visual acuity indicate the age, the gender (e.g., M: man, F: female), the nationality (e.g., JP: Japanese, US: American), the birthplace (e.g., city that represents whereabouts), the occupation and the visual acuity of the visitor who owns the wireless terminal 200. Also, of items shown in FIG. 12, colorblindness, blindness, hearing loss and perception of light indicate whether the visitor who possesses the wireless terminal 200 has these disabilities (Y for having, N for not having).

The identification information storage unit 202, which is realized by the ROM 23 shown in FIG. 4, stores identification information of the wireless terminal 200. The identification information is, for example, a MAC address the wireless communication device 24 has.

The location information storage unit 203, which is realized by the ROM 23 shown in FIG. 4, stores the location information distributed by the distribution apparatus 300. FIG. 11 shows an example of the location information stored in the location information storage unit 203.

The attribute information obtaining unit 204, which is realized by processes of the CPU 21 and the wireless communication device 24 in FIG. 4, obtains the attribute information from an external apparatus using any method (e.g., wireless communications via the wireless communication device 24, or serial communications via a serial interface (not shown)).

The attribute information obtaining unit 204 stores the obtained attribute information in the attribute information storage unit 201.

The location information obtaining unit 205, which is realized by processes of the CPU 21 and the positioning signal reception device 25 shown in FIG. 4, receives the location information distributed by the distribution apparatus 300 and stores the received location information in the location information storage unit 203.

The transmission unit 206, which is realized by processes of the CPU 21 and the wireless communication device 24 shown in FIG. 4, reads the identification information from the identification information storage unit 202, reads the location information from the location information storage unit 203 and reads the attribute information from the attribute information storage unit 201. Then, the transmission unit 206 transmits the above information to the management apparatus 100 through the distribution apparatus 300.

(3.3 Management Apparatus)

The management apparatus 100 in an embodiment of the present invention includes an exhibit information storage unit 101, a content information storage unit 102, a location information storage unit 103, an attribute information storage unit 104, a reception unit 105, a determination unit 106, a selection unit 107 and an output instruction unit 108.

The exhibit information storage unit 101, which is realized by the HDD 14 shown in FIG. 3, stores exhibit information indicating a location at which an exhibit is located. FIG. 7 shows an example of a table storing exhibit information. The table shown in FIG. 7 includes the following items:

Name of exhibit: Name attached to the exhibit

Latitude, longitude, floor: Location information indicating the location at which the exhibit is located (in the following example, building number is omitted for the sake of description simplicity)

The content information storage unit 102, which is realized by the HDD 14 shown in FIG. 3, stores content information indicating information of content to be output in relation to the exhibit. FIG. 8 shows an example of a table storing content information. The table shown in FIG. 8 includes the following items:

Number: Number attached to the content

Name of exhibit: Name of exhibit which the content is associated with

Content ID: ID attached to content; Multiple numbers of content may be associated with one exhibit Age, gender, nationality, birthplace, occupation, visual acuity, colorblindness, blindness (or total blindness), hearing loss, perception of light: Conditions for selection as output content; "*" indicates no condition is specified; For example, the content with a Content ID "pic1_jp_large" is selected for a visitor with an attribute of age "61 or older" or visual acuity "lower than 0.3"; Similarly, the content with a Content ID "pic1_us" is selected for a visitor with an attribute of nationality "US"; the content with a Content ID "pic1_jp_default" is selected for a visitor with attributes which do not meet any of the specified conditions.

The location information storage unit 103, which is realized by the HDD 14 shown in FIG. 3, stores location information received from the wireless terminal 200. FIG. 9 shows an example of a table storing the location information. The table shown in FIG. 9 includes the following items:

Identification information: Identification information for uniquely identifying a wireless terminal 200 (e.g., MAC address of the wireless terminal)

Latitude, longitude, floor: Location information for specifying a location of a wireless terminal 200 (building number is omitted)

Reception date and time: Information indicating date and time when location information is received The attribute information storage unit 104, which is realized by the HDD 14 shown in FIG. 3, stores attribute information received from the wireless terminal 200. FIG. 10 shows an example of a table storing attribute information. The table shown in FIG. 10 includes the following items:

Identification information: Identification information uniquely identifying a wireless terminal 200 (e.g., MAC address of the wireless terminal)

Age, gender, nationality, birthplace, occupation, visual acuity, colorblindness, blindness, hearing loss, perception of light: Attribute information received from a wireless terminal 200

The reception unit 105, which is realized by processes of the CPU 11 and NIC 15 shown in FIG. 3, receives identification information, location information and attribute information transmitted by the wireless terminal 200 via the distribution apparatus 300 (and the gateway 400). The received location information, together with the identification information, is stored in the location information storage unit 103, and the attribute information is, together with the identification information, stored in the attribute information storage unit 104.

The determination unit 106, which is realized by processes of the CPU 11 shown in FIG. 3, using the location information of the wireless terminal 200 as a key, searches through the exhibit information stored in the exhibit information storage unit 101, and determines whether there is an exhibit having the same location information. The determination unit 106, upon determining that there is an exhibit that has the same location information as the wireless terminal 200, passes the name of the exhibit and the identification information of the wireless terminal to the selection unit 107.

The selection unit 107, which is realized by processes of the CPU 11 shown in FIG. 3, upon receiving the name of the exhibit and the identification of the wireless terminal from the determination unit 106, reads the attribute information stored in the attribute information storage unit 104, and, using the received identification information of the wireless terminal as a key, identifies the corresponding attribute information. Also, the selection unit 107, using the received name of the exhibit as a key, identifies the corresponding Content ID and information of various conditions of age, gender, or the like. Then, the selection unit 107 identifies a Content ID with a condition satisfied by the identified attribute information and passes the Content ID to the output instruction unit 108.

A specific example of a process of the selection unit 107 will be described in which, using the identified attribute information, a Content ID which has a condition satisfied by the identified attributes is identified. For example, in the case where the identified attribute information (FIG. 10) includes "Y" for an item "color blind", "blind", "hearing loss", or "perception of light", the selection unit 107 may select content whose content information (FIG. 8) includes "Y" for one of the above items. Also, the selection unit 107 may select content whose content information includes the same information for items "gender", "nationality", "birthplace" and "occupation" as the information included in the attribute information. Also, the selection unit 107 may select content whose content information includes the same values for attribute items "age" and "visual acuity" included in the attribute information.

For example, it is assumed that the selection unit 107 receives attribute information represented by the identification information "012345672002" and the name of the exhibit "Drawing 2" (refer to FIG. 8 and FIG. 10). As the information of the item "blind" of the attribute information is "Y", the selection unit 107 identifies content IDs "pic2_soundonly_jp" and "pic2_soundonly_eng" whose corresponding item is "Y". Further, as the information of the item "nationality" of the attribute information is "US", the selection unit 107 identifies the content ID "pic2_soundonly_eng".

Also, referring to other example for the description, it is assumed that the selection unit 107 receives attribute information represented by the identification information "012345672001" and the name of the exhibit "Drawing 1" (refer to FIG. 8 and FIG. 10). As the information of the item "visual acuity" is "0.2", the selection unit 107 identifies the content ID "pic1_jp_large" whose corresponding item is "less than 0.3".

The selection unit 107 can identify a content ID of content by referring to identified attribute information and conditions indicated by the content information in any way not limited to the way described above. It should be noted that the further specific examples of content selection by the selection unit 107 will be described in section 5 herein.

The output instruction unit 108, which is realized by processes of the CPU 11 and the NIC 15, instructs the output equipment 500 to output the content corresponding to the content ID received from the selection unit 107. It should be noted that the output instruction unit 108 may transmit the content itself to the output equipment 500 or transmit information such as a file name which identifies the content to the output equipment 500.

By using the function described above, the content selection system 1 according to the present embodiment can select appropriate content according to the attributes of the visitor near the exhibit and output the content.

4. OPERATION EXAMPLES

Figure 14:
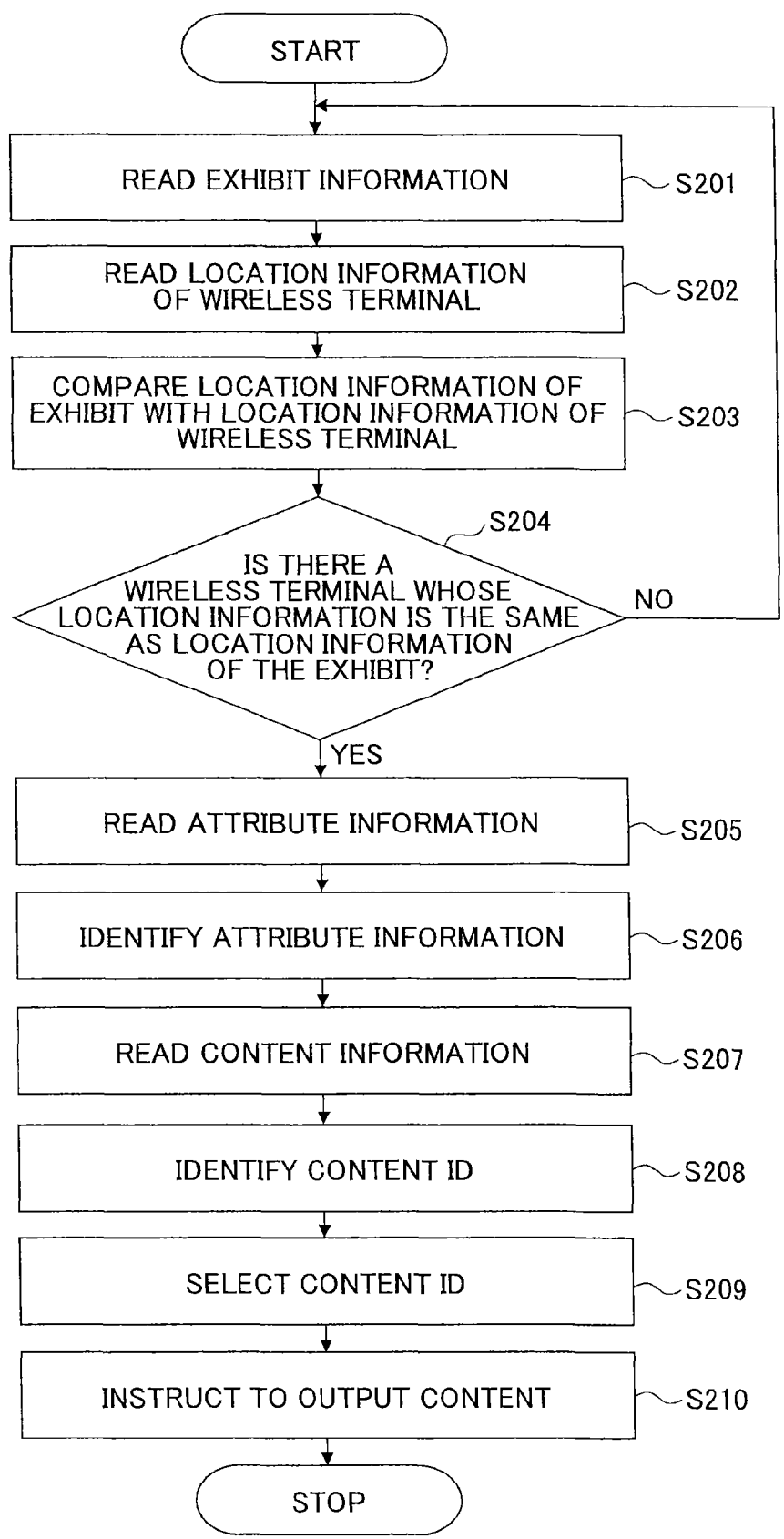
FIG. 14 is a flowchart illustrating a content selection process.
Figure 15:
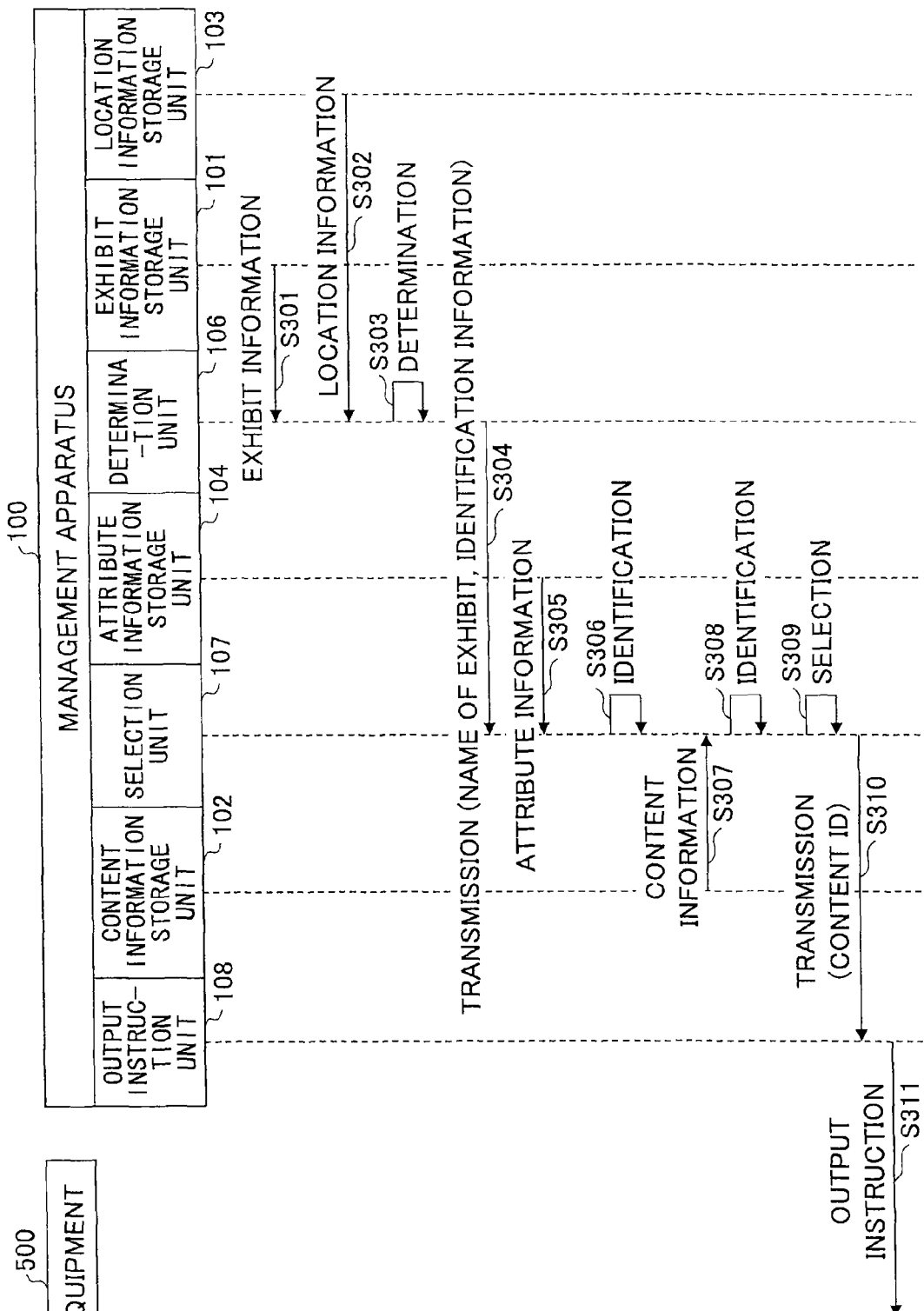
FIG. 15 is a sequence diagram illustrating the content selection process.

Next, referring to FIG. 13 through FIG. 15, the operation examples of the content selection system 1 according to an embodiment of the present invention will be described. In the following, the description will be divided into a "location information and attribute information obtaining process" and a "content selection process" of the wireless terminal in the content selection system 1.

(4.1 Location Information and Attribute Information Obtaining Process)

Figure 13:
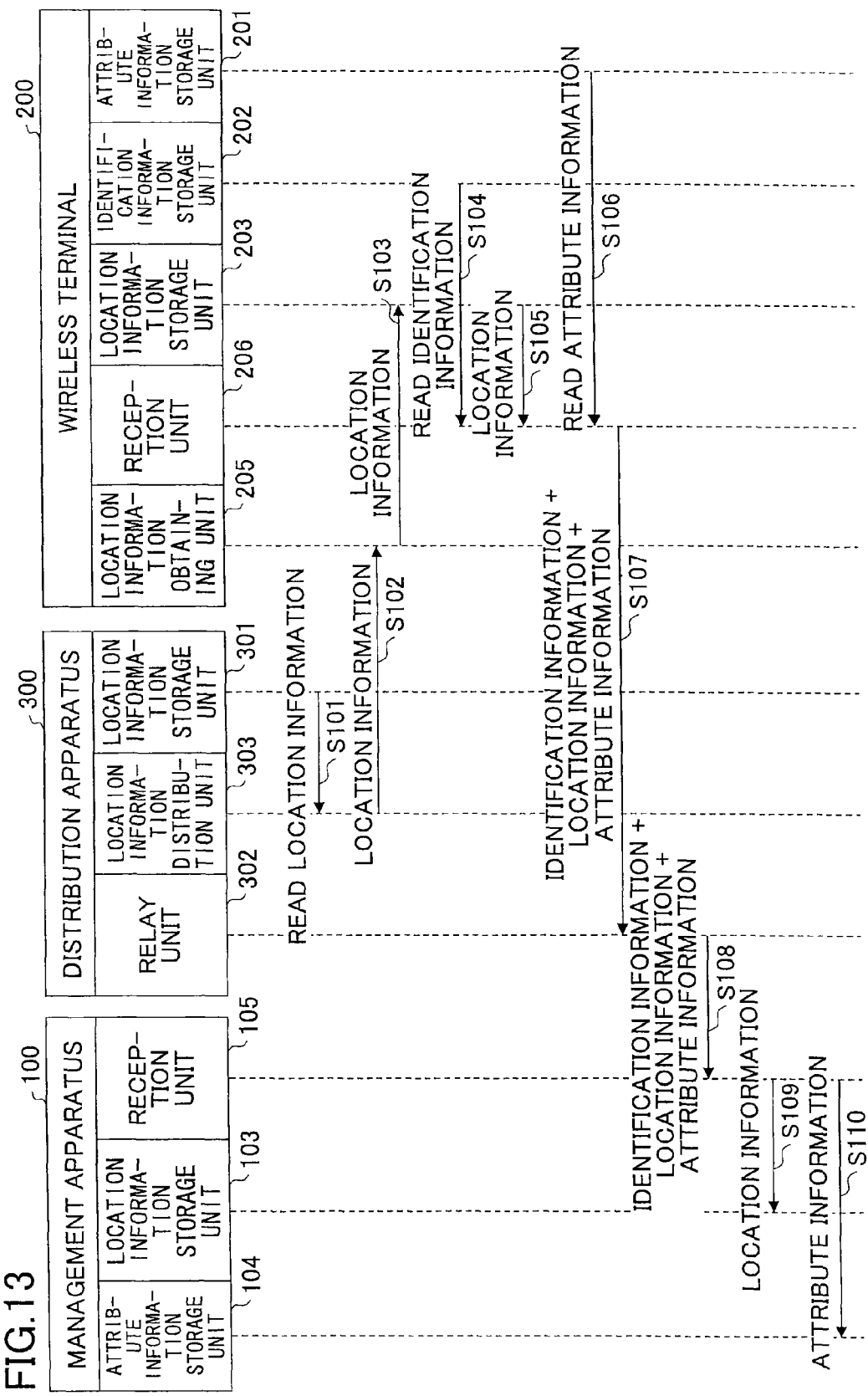
FIG. 13 is a sequence diagram illustrating a location information and attribute information obtaining process.

First, FIG. 13 shows a sequence diagram of a process in which the management apparatus 100 in the present embodiment obtains location information and attribute information of the wireless terminal 200 through the wireless network. Here, the description will be provided assuming that the location information distributed by the distribution apparatus 300 includes, as shown as an example in FIG. 11, latitude "35.46100", longitude "139.38090", floor "1" and building number "2" and the identification information of the wireless terminal 200 is "012345672001". It should be noted that it is assumed that the wireless terminal 200 stores in advance attribute information shown in FIG. 12.

Then, the location information distribution unit 303 of the distribution apparatus 300 reads the location information stored in the location information storage unit 301 (latitude "35.46100", longitude "139.38090", floor "1" and building number "2") (step S101). Then, the location information distribution unit 303 distributes the positioning signal including the location information read in step S101 to wireless terminals within the predetermined range (step S102).

Then, the location information obtaining unit 205 of the wireless terminal 200 within the broadcast range of the positional signal obtains location information from the received positioning information and stores the location information in the location information storage unit 203 (step S103).

Then, the transmission unit 206 reads the identification information "012345672001" stored in the identification information storage unit 203 (step S104). Also, the transmission unit 206 reads the location information (latitude "35.46100", longitude "139.38090", floor "1" and building number "2") stored in the location information storage unit 203 (step S105). Further, the transmission unit 206 reads the attribute information stored in the attribute information storage unit 201 (refer to FIG. 12) (step S106). Then, the transmission unit 206 transmits the read identification information, location information and attribute information to the distribution apparatus 300 (step S107).

The relay unit 302 of the distribution apparatus 300 receives the identification information, the location information and the attribute information transmitted by the wireless terminal 200 and transmits these pieces of information to the management apparatus 100 through the gateway (step S108).

The reception unit 105 of the management apparatus 100 receives the identification information, the location information and the attribute information transmitted by the wireless terminal 200 via the distribution apparatus 300 and stores the received location information together with the identification information in the location information storage unit 103 (step S109, refer to FIG. 9). It should be noted that only the information of latitude, longitude and floor is stored. Also, the reception unit 105 stores the received attribute information together with the identification information in the attribute information storage unit 104 (step S110, refer to FIG. 10).

With the process described above, the management apparatus 100 in the present embodiment can obtain the location information indicating the current location of the wireless terminal 200 and the attribute information associated with the wireless terminal 100.

(4.2 Content Selection Process (Process Flow))

Next, referring to FIG. 14, the process flow of the content selection process of the management apparatus 100 in the present embodiment will be described.

First, the determination unit 106 of the management apparatus 100 reads exhibit information stored in the exhibit information storage unit 101 (step S201, refer to FIG. 7). Then, the determination unit 106 reads the location information of each of the wireless terminals stored in the location information storage unit 103 (step S202, refer to FIG. 9). Then, the determination unit 106 compares the location information included in the exhibit information and the location information of each of the wireless terminals (step S203).

The determination unit 106 determines whether there is a wireless terminal whose location information coincides with the location information of some exhibit included in the exhibit information (step S204). Then, in the case where it is determined that there is a wireless terminal whose location information coincides with the location information of some exhibit (YES for step S204), the selection unit 107 reads the attribute information (FIG. 10) (step S205). Then, the selection unit 107 identifies the attribute information associated with the identification of the wireless terminal (step S206).

On the other hand, in step S204, in the case where there is no wireless terminal whose location information coincides with the location information of some exhibit (NO for step S204), the flow returns to step S201, and after a predetermined time elapses, the determination unit 106 reads the exhibit information again.

After step S206, the selection unit 107 reads the content information (FIG. 8) (step S207). Then, using the name of the exhibit whose location information has coincided with the location information of a wireless terminal in step S204, the selection unit 107 searches through the content information and identifies the target content ID (step S208). Then, the selection unit 107 selects the content ID of the content whose condition is satisfied by the attribute information identified in step S206 (step S209). Then, the output instruction unit 108 instructs the output equipment to output the content corresponding to the selected content ID (step S210).

With the process described above, the management apparatus 100 in the present embodiment can output the content in accordance with the attributes of the visitor who possesses the wireless terminal near the exhibit.

(4.3 Content Selection Process (Operation Examples))

Next, referring to FIG. 15, the operation examples of the content selection process of the management apparatus 100 in the present embodiment will be described.

First, the determination unit 106 of the management apparatus 100 reads the exhibit information stored in the exhibit information storage unit 101 (step S301). Then, the determination unit 106 reads location information of each of the wireless terminals stored in the location information storage unit 103 (step S302, refer to FIG. 9). Then, the determination unit 106 compares the location information of the exhibit included in the exhibit information (refer to FIG. 7) with the location information of each of the wireless terminals (refer to FIG. 9) (step S303). Then, the determination unit 106 determines that the location information of the wireless terminal (identification information "012345672001") coincides with the location information (latitude "35.46100", longitude "139.38090", floor "1") of the exhibit with the name of exhibit "drawing 1" (step S303). Then, the determination unit 106 passes the name of exhibit "drawing 1" and the identification information of the wireless terminal "012345672001" to the selection unit 107.

The selection unit 107 of the management apparatus 100 reads the attribute information from the attribute information storage unit 104 (step S305). Then, the selection unit 107 identifies the attribute information ("age" is "25", "gender" is "M", "nationality" is "JP", "birthplace" is "Yokohama", "occupation" is "IT", "visual acuity" is "0.2", "color blind", "blind", "hearing loss" and "perception of light" are all "N") corresponding to the identification "012345672001" received at step S304 (step S306).

Then, the selection unit 107 of the management apparatus 100 reads the content information from the content information storage unit 102 (step S307). Then, the selection unit 107 identifies content IDs ("pic1_jp_default", "pic1_jp_large" and "pic1_us") of content corresponding to the name of exhibit "drawing 1" received at step S304 (step S308). Then, the selection unit 107 selects the content whose condition matches the read attribute information (step S309). Here, as the item of "visual acuity" is "0.2" in the attribute information associated with the identification information "012345672001", the content ID "pic1_jp_large" is identified. Then, the selection unit 107 transmits the identified content ID to the output instruction unit 108 (step S310).

Then, the output instruction unit 108 instructs the output equipment 500 to output the content which has the transmitted content ID (step S311). It should be noted that the content IDs are associated with the entities of the content in advance by a table or the like (not shown).

With the operations described above, the management apparatus 100 in the present embodiment can output the content in accordance with the attributes of the visitor who appreciates the exhibit by dynamically switching the content.

5. SPECIFIC EXAMPLES OF CONTENT SELECTION

Next, referring to FIG. 16 through FIG. 31, specific examples of content selection by the management apparatus 100 using attribute information of visitors will be described. In FIG. 16 through FIG. 31, the distribution apparatus 300 installed near the drawing as an exhibit, the output equipment 500 of a speaker, a display, or the like, and one or more wireless terminals 200 setup with predetermined attribute information are shown. Each of the wireless terminals are possessed by a respective visitor who moves around as he appreciates the exhibits.

Figure 16:
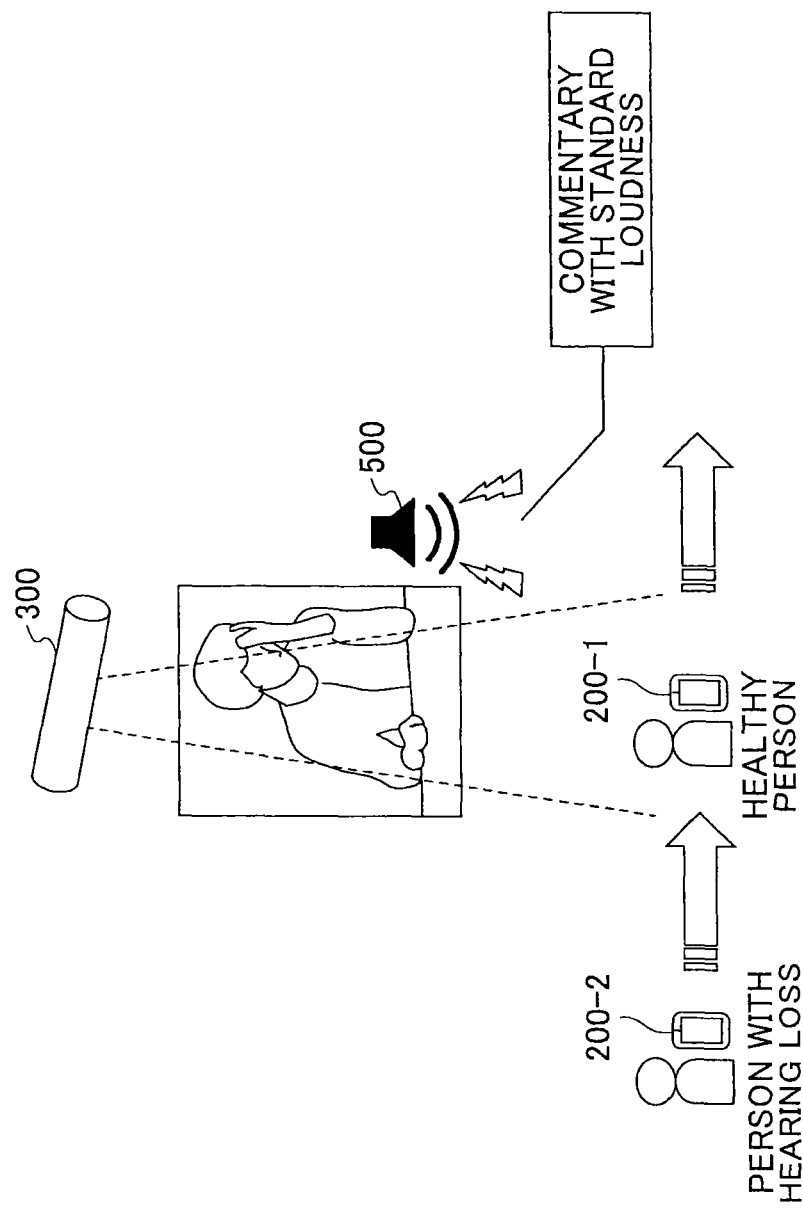
FIG. 16 is a drawing illustrating a specific example of content selection.
Figure 17:
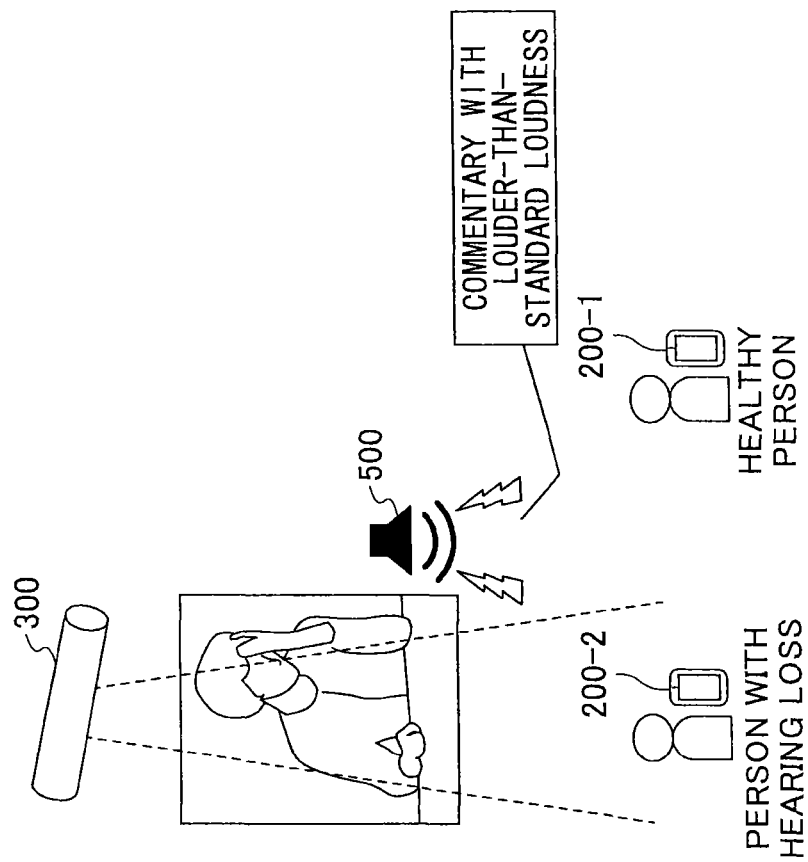
FIG. 17 is a drawing illustrating a specific example of content selection.

FIG. 16 shows an example in which in the case where the wireless terminal 200-1 possessed by a healthy person in which attribute information "color blind", "blind", "hearing loss" and "perception of light" is not set to "Y" is near the exhibit, the management apparatus 100 reproduces content which has a normal loudness. On the other hand, FIG. 17 shows an example in which in the case where the wireless terminal 200-2 possessed by a person with hearing loss in which attribute information "hearing loss" is set to "Y" is near the exhibit, the management apparatus 100 reproduces content which has a louder-than-normal loudness.

It is not shown but as another example, in the case where the wireless terminal possessed by a person with color blindness in which attribute information "color blind" is set to "Y" is near the exhibit, the management apparatus 100 may reproduce content in which the use of color is changed. Also, in the case where the management apparatus usually reproduces video content, when the wireless terminal possessed by a person who is blind in which attribute information "blind" is set to "Y" is near the exhibit, the management apparatus 100 may reproduce audio content.

Figure 18:
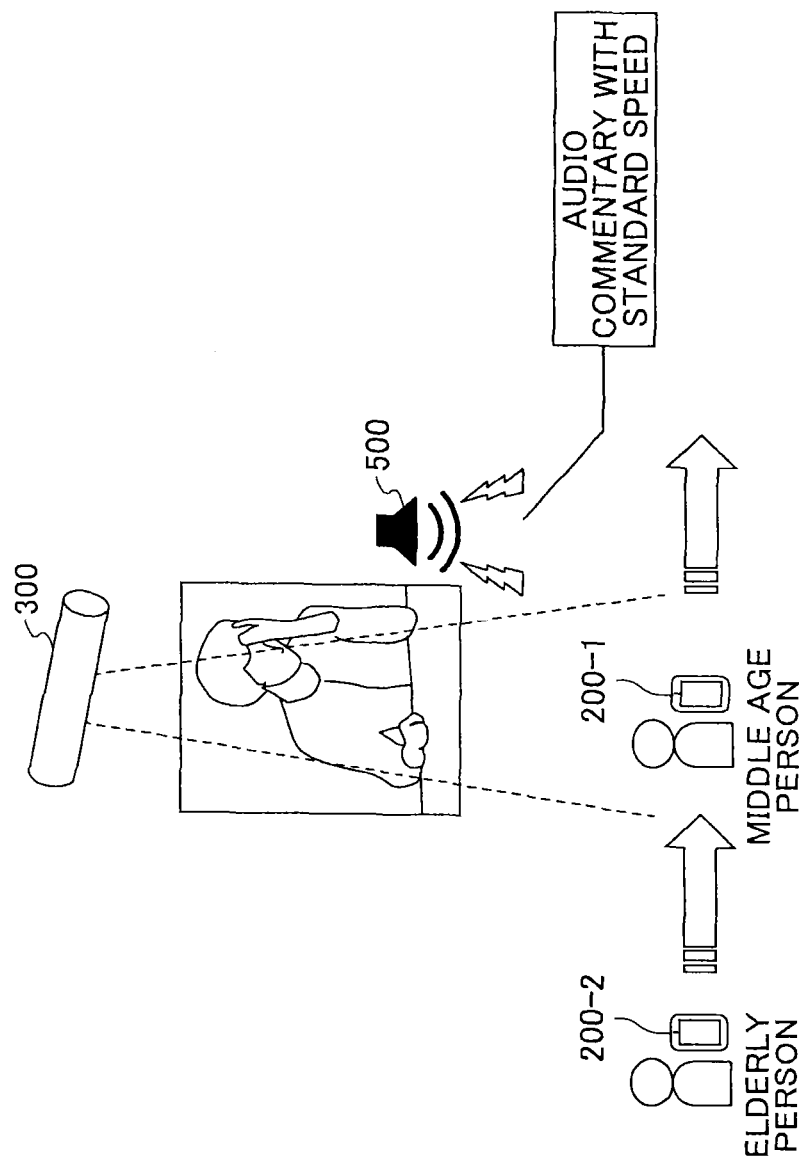
FIG. 18 is a drawing illustrating a specific example of content selection.
Figure 19:
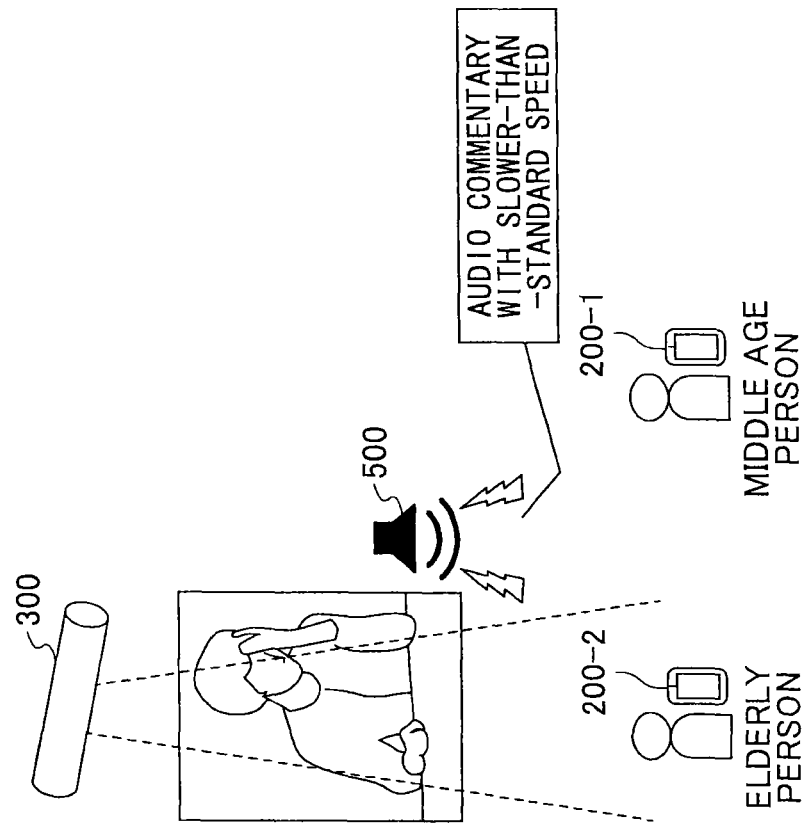
FIG. 19 is a drawing illustrating a specific example of content selection.

FIG. 18 shows an example in which in the case where the wireless terminal 200-1 possessed by a middle aged person in which attribute information of "age" is set to "40" is near the exhibit, the management apparatus 100 reproduces content which has a normal reproduction speed. On the other hand, FIG. 19 shows an example in which in the case where the wireless terminal 200-2 possessed by an elderly person in which attribute information of "age" is set "80" is near the exhibit, the management apparatus reproduces content which explains the exhibit with the slower-than-normal reproduction speed.

It is not shown but as another example, in the case where the wireless terminal possessed by a child is near the exhibit, the management apparatus may reproduce content which uses more easy-to-understand words and phrases or hiragana characters.

Figure 20:
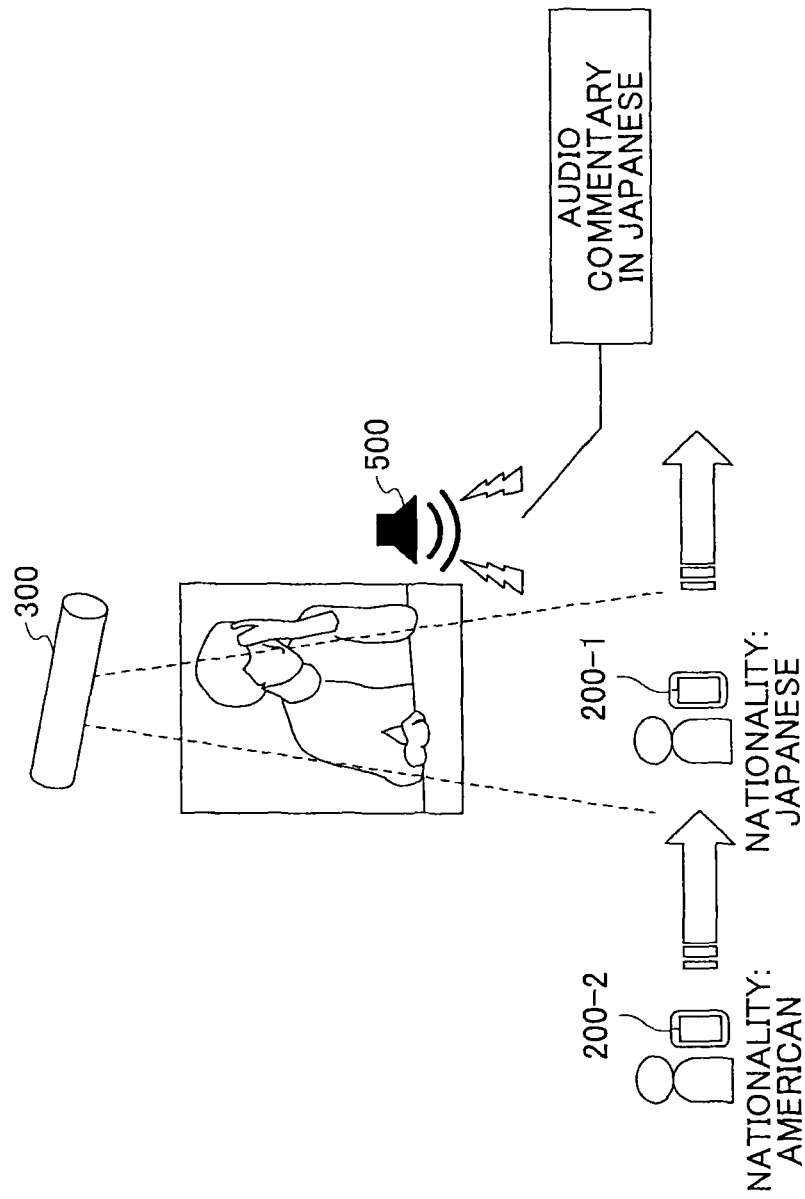
FIG. 20 is a drawing illustrating a specific example of content selection.
Figure 21:
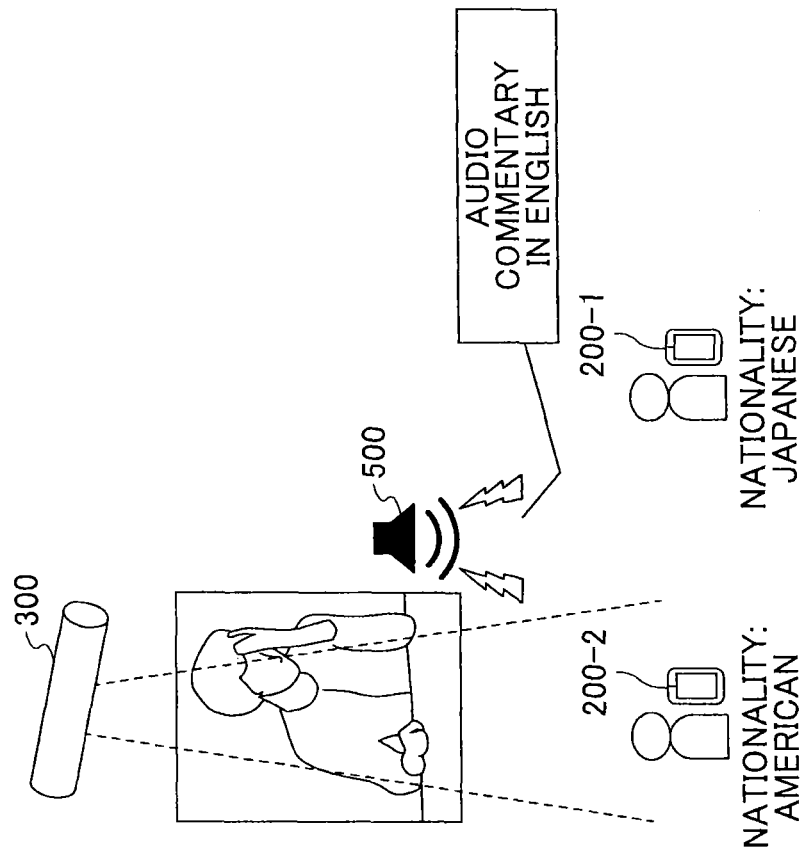
FIG. 21 is a drawing illustrating a specific example of content selection.

FIG. 20 shows an example in which in the case where the wireless terminal possessed by a Japanese person in which the attribute information "nationality" is set to "JP (Japanese)" is near the exhibit, the management apparatus 100 reproduces Japanese content. On the other hand, FIG. 21 shows an example in which in the case where the wireless terminal possessed by an American person in which the attribute information "nationality" is set to "US (American)" is near the exhibit, the management apparatus 100 reproduces English content.

Figure 22:
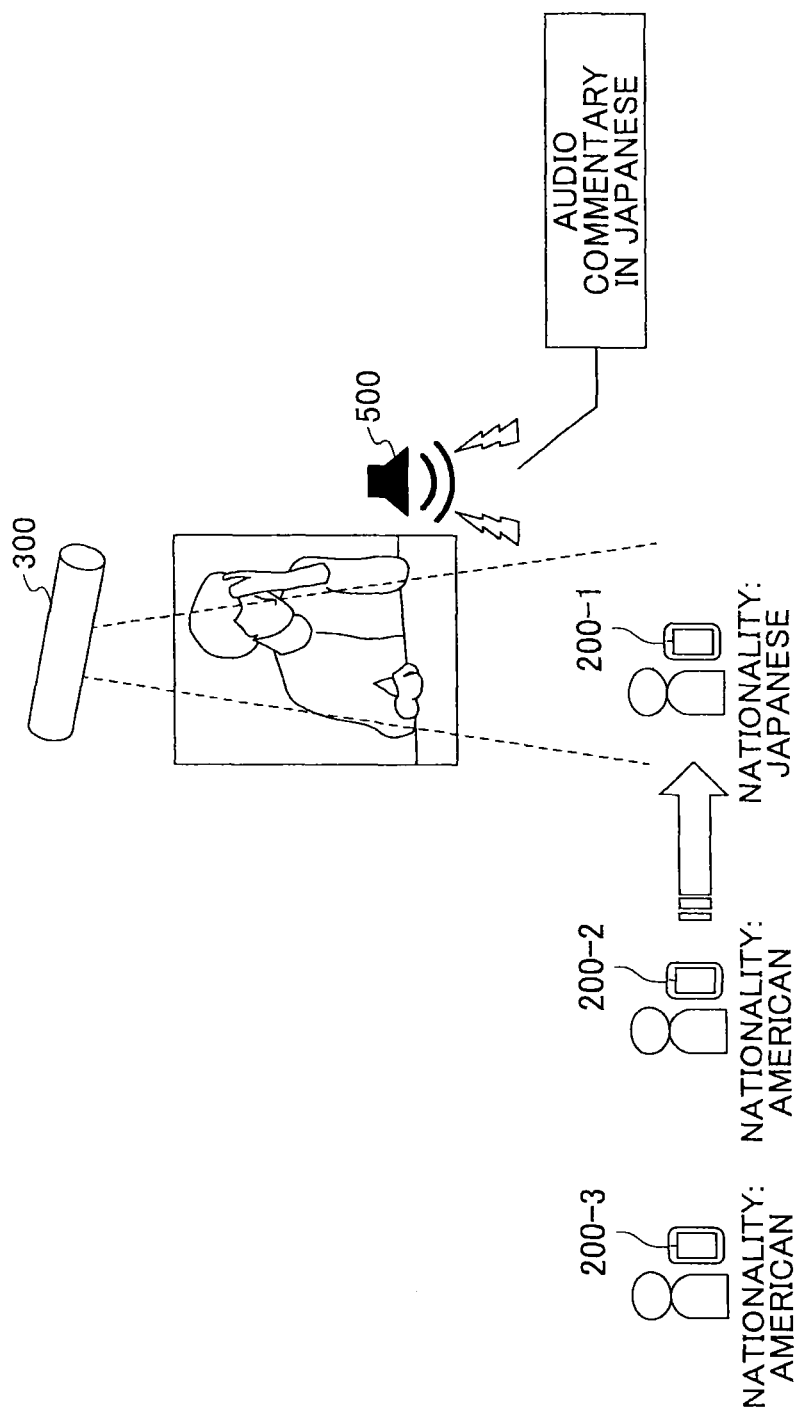
FIG. 22 is a drawing illustrating a specific example of content selection.
Figure 23:
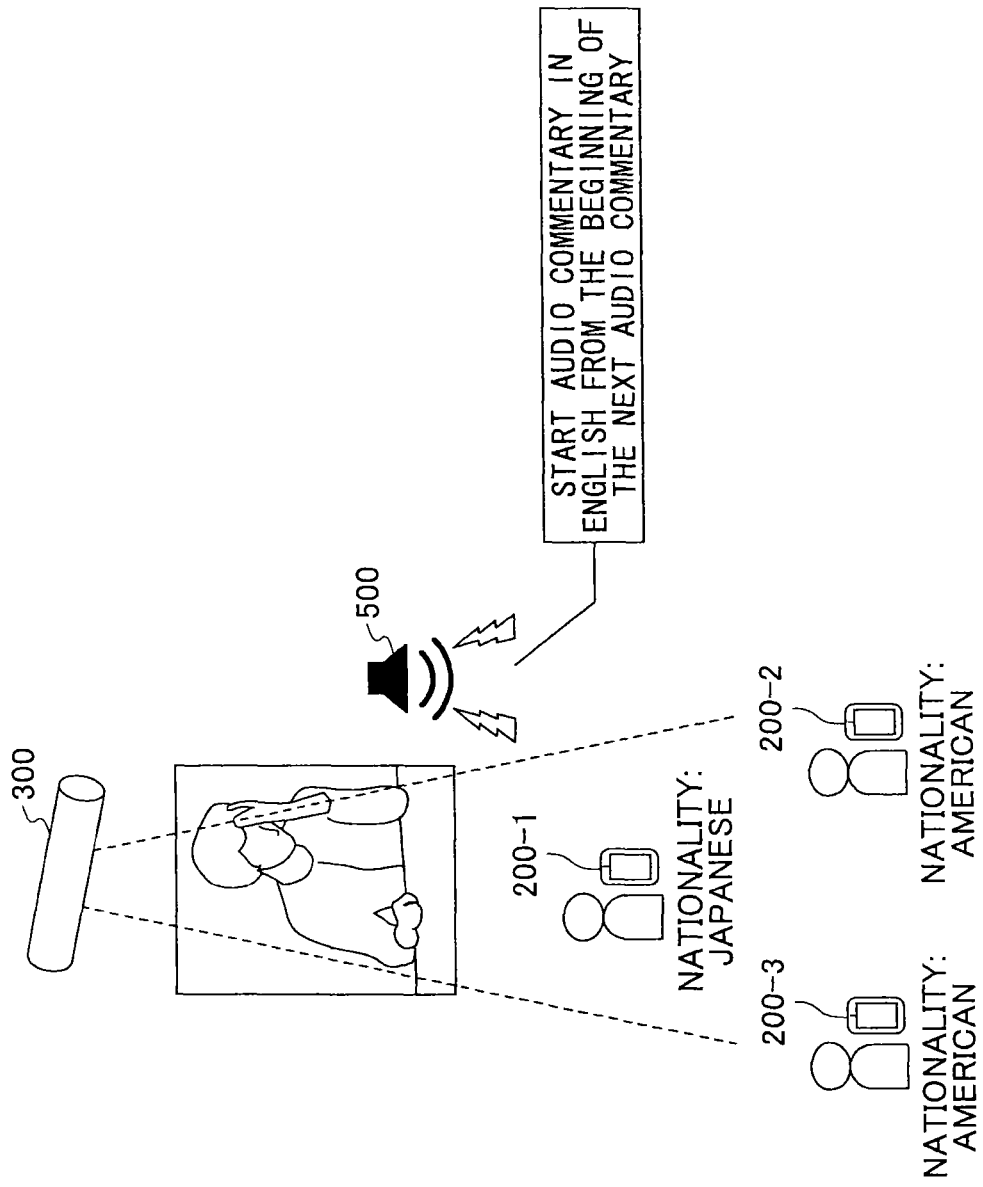
FIG. 23 is a drawing illustrating a specific example of content selection.

FIG. 22 shows an example in which in the case where the wireless terminal 200-1 in which the attribute information "nationality" is set to "JP (Japanese)" is near the exhibit, the management apparatus 100 reproduces Japanese content. On the other hand, FIG. 23 shows an example in which wireless terminals 200-2 and 200-3 possessed by American people in each of which the attribute information "nationality" is set to "US (American)" are at the same location as the above wireless terminal 200-1, the management apparatus 100 reproduces English content. In this way, the management apparatus 100 may switch the content to be reproduced in accordance with the number of wireless terminals which are at the same location and in each of which one of attribute information items (here, "nationality") is set the same.

Figure 24:
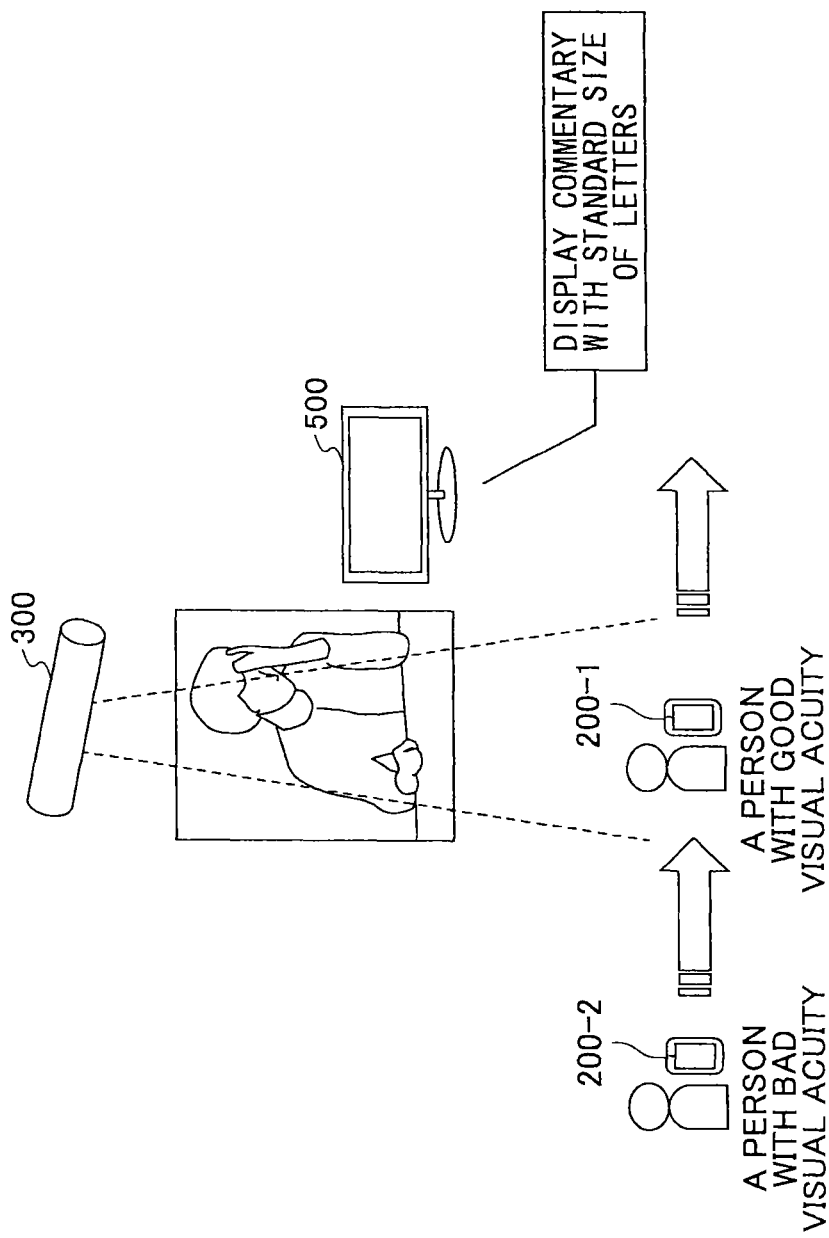
FIG. 24 is a drawing illustrating a specific example of content selection.
Figure 25:
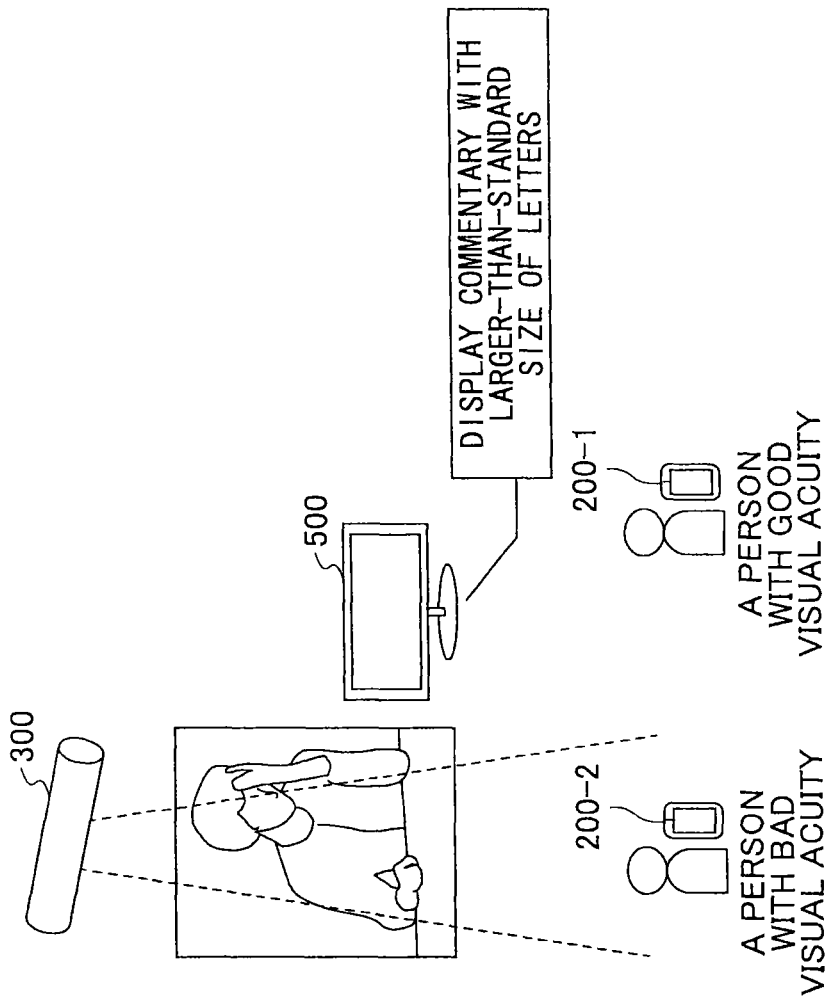
FIG. 25 is a drawing illustrating a specific example of content selection.

FIG. 24 shows an example in which in the case where the wireless terminal 200-1 possessed by a person with good visual acuity in which the attribute information "visual acuity" is set to "1.5" is near the exhibit, the management apparatus 100 reproduces content with letters of a normal size. On the other hand, FIG. 25 shows an example in which in the case where the wireless terminal 200-2 possessed by a person with bad visual acuity in which the attribute information "visual acuity" is set to "0.1" is near the exhibit, the management apparatus 100 reproduces content with letters of bigger-than-normal size.

Figure 26:
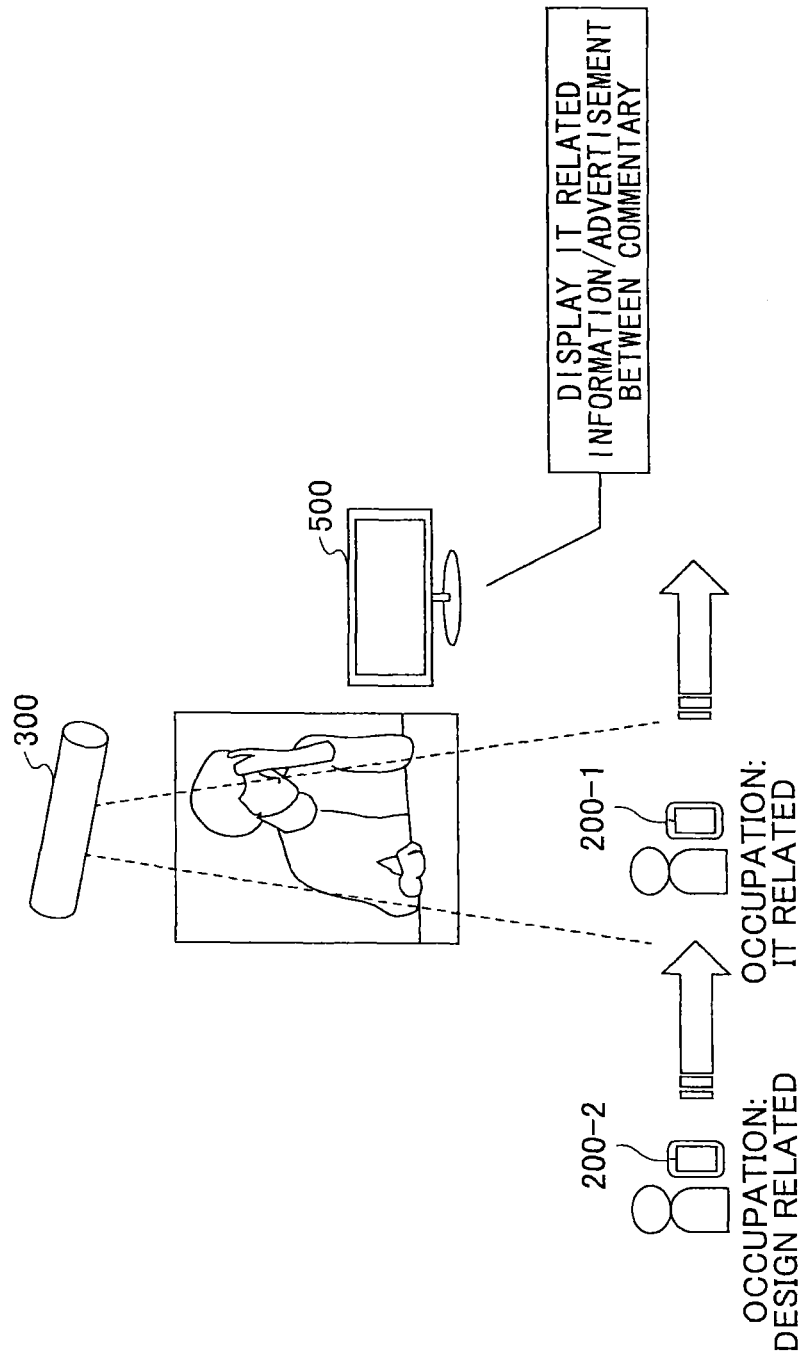
FIG. 26 is a drawing illustrating a specific example of content selection.
Figure 27:
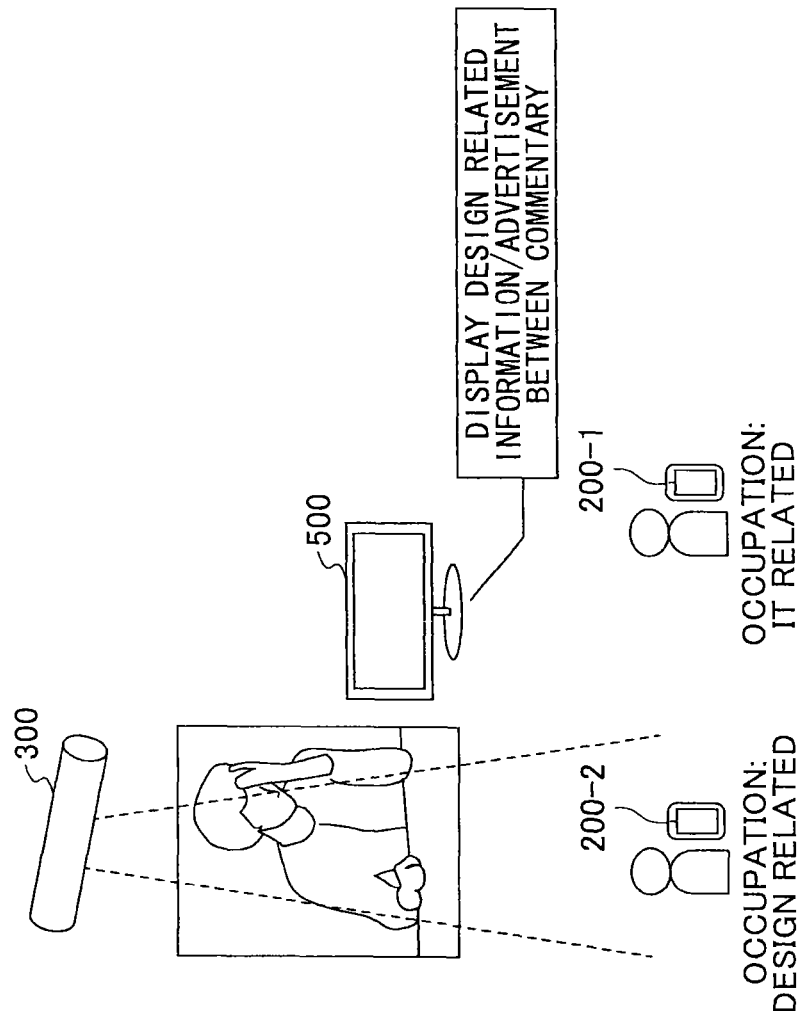
FIG. 27 is a drawing illustrating a specific example of content selection.

FIG. 26 shows an example in which in the case where the wireless terminal 200-1 possessed by a person with an IT related occupation in which the attribute information "occupation" is set to "IT (Information Technology)" is near the exhibit, the management apparatus 100 reproduces content with an IT related advertisement or the like. On the other hand, FIG. 27 shows an example in which in the case where the wireless terminal 200-2 possessed by a person whose occupation is related to design in which the attribute information "occupation" is "Designer" is near the exhibit, the management apparatus 100 reproduces content with a design related advertisement or the like.

Figure 28:
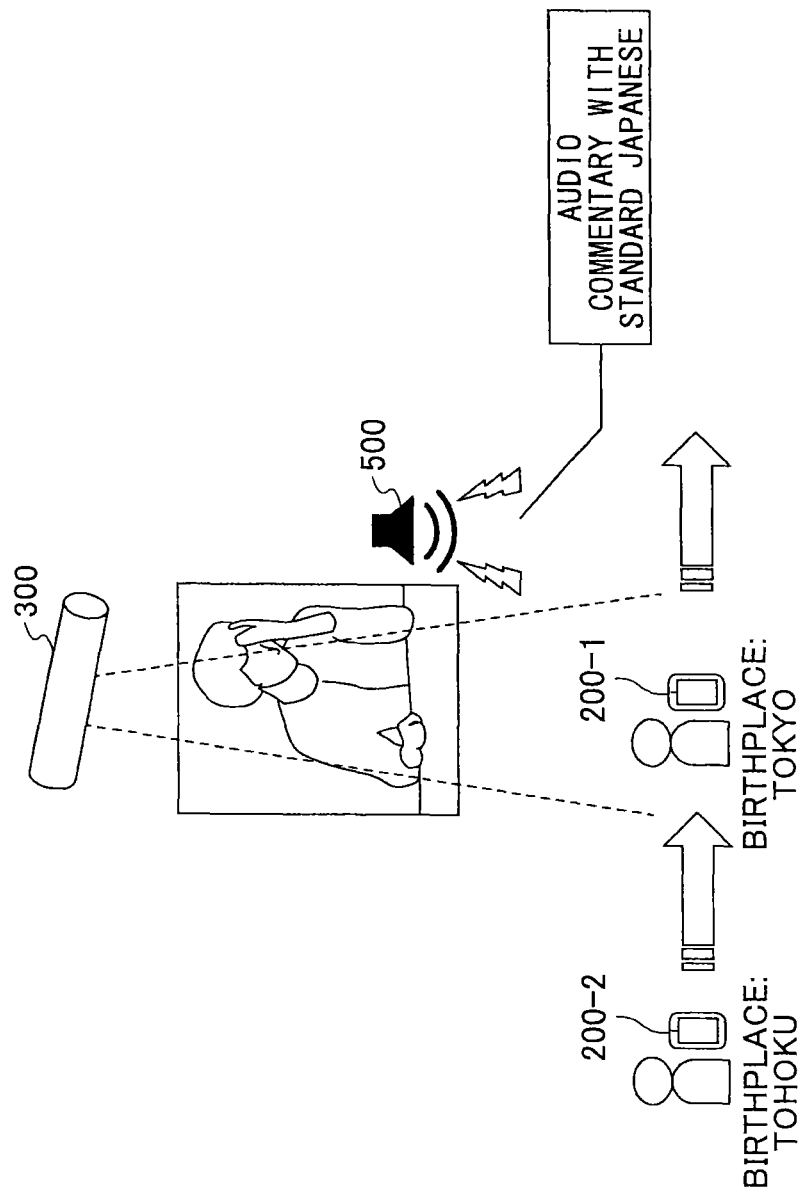
FIG. 28 is a drawing illustrating a specific example of content selection.
Figure 29:
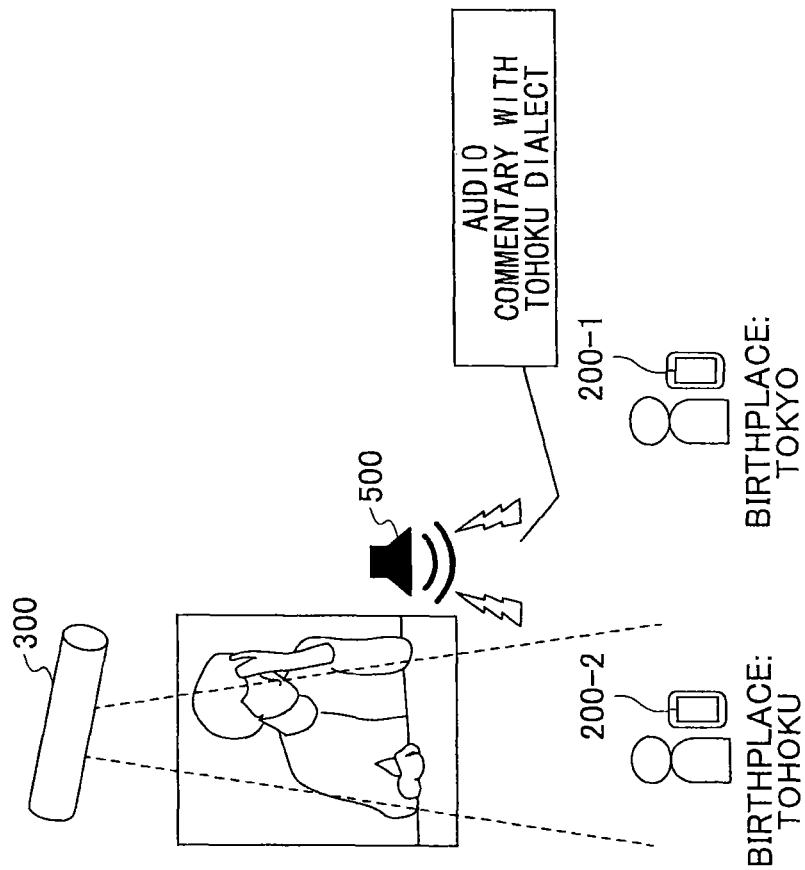
FIG. 29 is a drawing illustrating a specific example of content selection.

FIG. 28 shows an example in which in the case where the wireless terminal 200-1 possessed by a person from Tokyo in which the attribute information "birthplace" is set to "Tokyo" is near the exhibit, the management apparatus 100 reproduces content with standard Japanese. On the other hand, FIG. 29 shows an example in which in the case where the wireless terminal 200-2 possessed by a person from Tohoku in which the attribute information "birthplace" is set to "Tohoku" is near the exhibit, the management apparatus 100 reproduces content with Tohoku dialect.

Figure 30:
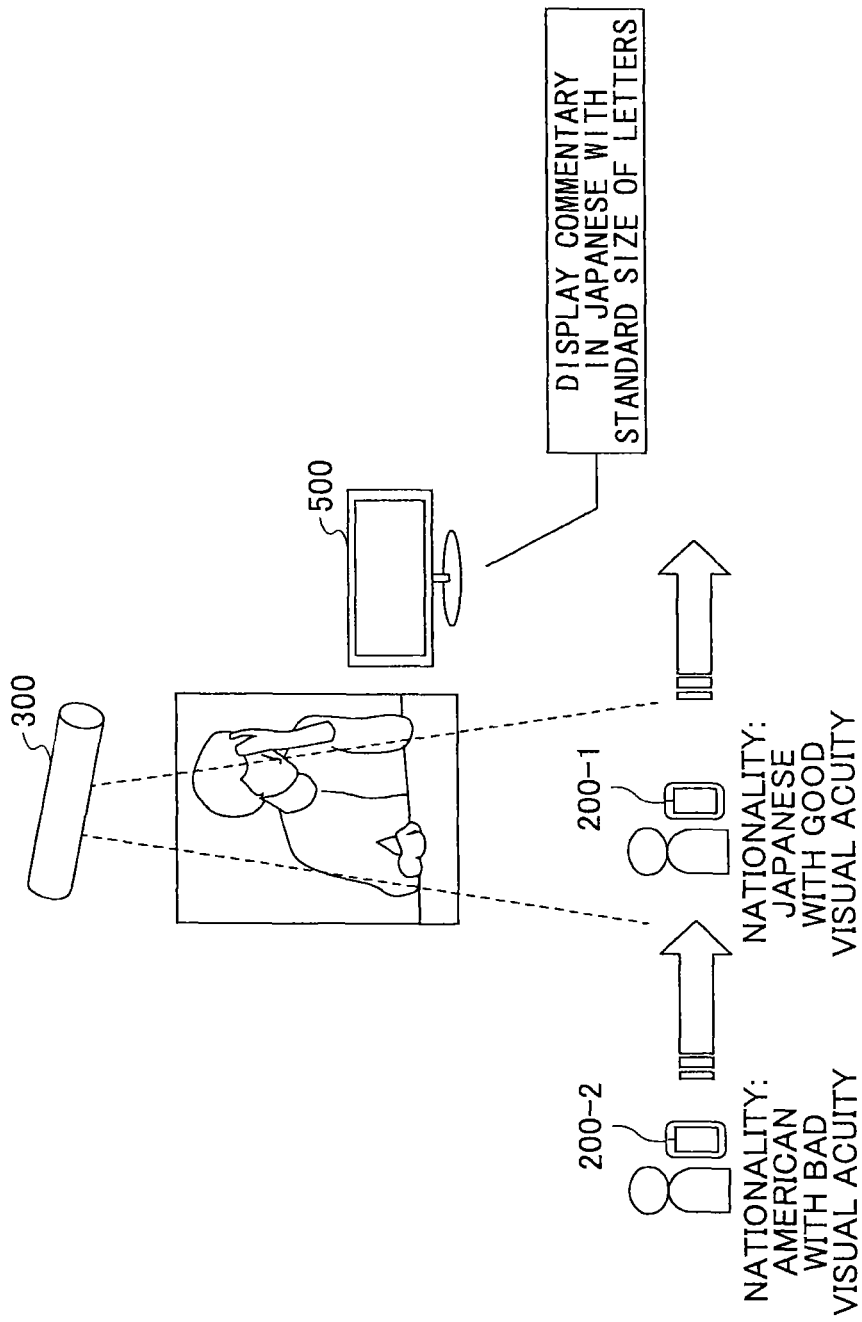
FIG. 30 is a drawing illustrating a specific example of content selection.
Figure 31:
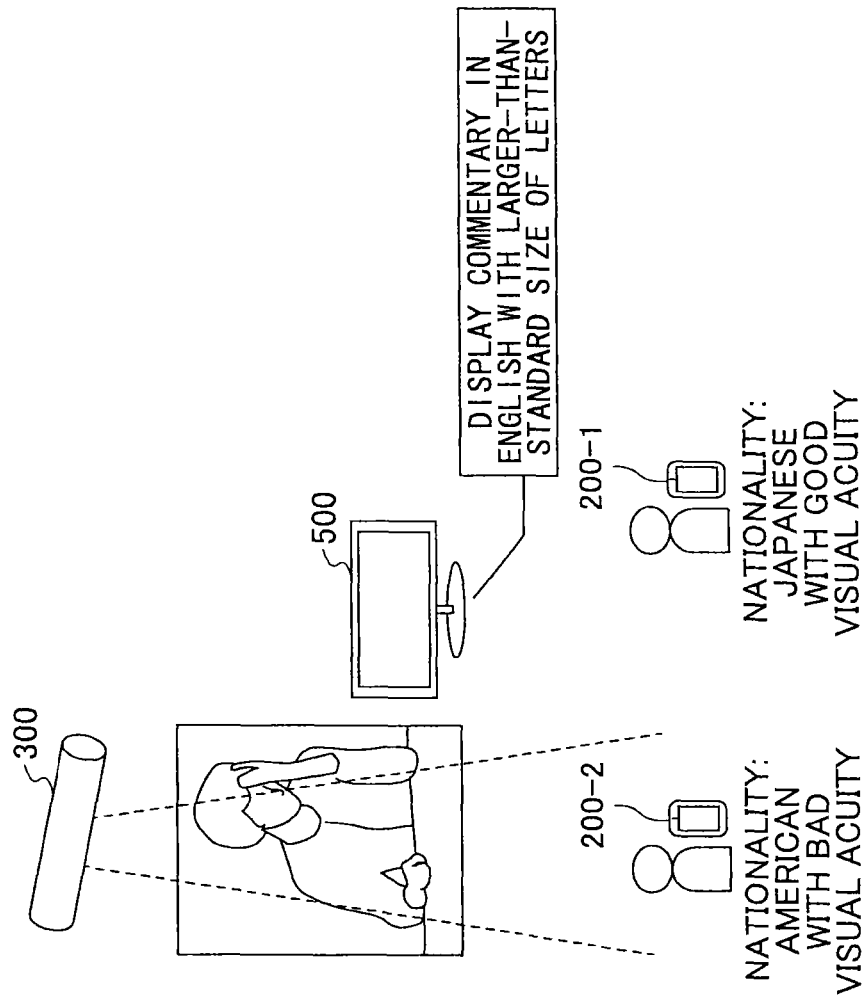
FIG. 31 is a drawing illustrating a specific example of content selection.

FIG. 30 shows an example in which in the case where the wireless terminal 200-1 possessed by a Japanese in which the attribute information "nationality" is set to "JP (Japanese)", "visual acuity" is set to "1.5" is near the exhibit, the management apparatus 100 reproduces Japanese content with letters of a standard size. On the other hand, FIG. 31 shows an example in which in the case where the wireless terminal 200-2 possessed by an American person in which the attribute information "nationality" is set to "US (American)", "visual acuity" is set to "0.1" is near the exhibit, the management apparatus 100 reproduces English content with letters of bigger-than-normal size.

As described above, the management apparatus 100 of the present embodiment can select content to be reproduced near the exhibit in accordance with the attribute information set in the wireless terminal. In this way, visitors can look at or listen to appropriate content in accordance with the visitor's age, nationality, visual acuity, or the like. Especially, visitors with a disorder in audiovisual, etc., can look at or listen to content they can understand.

Further, the present invention is not limited to these embodiments, and various variations and modifications may be made without departing from the scope of the present invention.

The present application is based on and claims the benefit of priorities of Japanese Priority Application No. 2013-179024 filed on Aug. 30, 2013 and Japanese Priority Application No. 2014-152793 filed on Jul. 28, 2014, the entire contents of which are hereby incorporated by reference.

What is claimed is:

1. A content selection system in which a management apparatus, a distribution apparatus and a wireless terminal are provided, the content selection system comprising:
    a distribution unit, disposed in the distribution apparatus, configured to distribute, within a predetermined spatial range, location information indicating a location at which the distribution apparatus is installed as a fixture;
    an obtaining unit, disposed in the wireless terminal, configured to obtain the location information distributed by the distribution unit within the predetermined spatial range;
    a transmission unit, disposed in the wireless terminal, configured to transmit the location information obtained by the obtaining unit to the management apparatus;
    a reception unit, disposed in the management apparatus, configured to receive the location information transmitted by the transmission unit;
    a determination unit, disposed in the management apparatus, configured to determine whether the location information received by the reception unit indicates a predetermined location; and
    a selection unit, disposed in the management apparatus, configured to select a content associated with the predetermined location for output thereat in response to the determination by the determination unit that the location information indicates the predetermined location.

2. The content selection system as claimed in claim 1, wherein the selection unit selects the content based on attribute information associated with the wireless terminal.

3. The content selection system as claimed in claim 2, further comprising a storage unit of the wireless terminal configured to store the attribute information, wherein
    the transmission unit transmits the attribute information stored in the storage unit together with the location information;
    the reception unit receives the attribute information together with the location information; and
    the selection unit selects the content based on the attribute information received by the reception unit.

4. The content selection system as claimed in claim 2, wherein the attribute information includes at least any of information items related to age, gender, nationality, birthplace, occupation, visual acuity, color blindness, blindness, hearing loss and perception of light.

5. The content selection system as claimed in claim 1, further comprising a relay unit configured to relay the location information transmitted by the transmission unit, wherein
    the transmission unit transmits the location information to the management apparatus via the relay unit; and
    the reception unit receives the location information via the relay unit.

6. The content selection system as claimed in claim 1, further comprising an instruction unit of the management apparatus configured to cause output equipment located at the predetermined location to output the content selected by the selection unit.

7. A content selection method performed by a content selection system in which a management apparatus, a distribution apparatus and a wireless terminal are provided, the content selection method comprising:
- distributing, by the distribution apparatus, within a predetermined spatial range, location information indicating a location at which the distribution apparatus is installed as a fixture;
- obtaining, by the wireless terminal, the location information distributed by the distribution apparatus within the predetermined spatial range in the distribution step;
- transmitting, by the wireless terminal, the location information obtained in the obtaining step to the management apparatus;
- receiving, by the management apparatus, the location information transmitted in the transmission step;
- determining, by the management apparatus, whether the location information received in the reception step indicates a predetermined location; and
- selecting, by the management apparatus, a content associated with the predetermined location for output thereat in response to the determination in the determination step that the location information indicates the predetermined location.

8. A management apparatus for managing content which output equipment outputs, the management apparatus comprising:
- a reception unit configured to receive location information indicating a location of a wireless terminal and attribute information associated with the wireless terminal in advance, wherein the location information corresponds to location information distributed by a distribution apparatus within a predetermined spatial range to indicate a location at which the distribution apparatus is installed as a fixture;
- a determination unit configured to determine whether the location information received by the reception unit indicates a predetermined location;
- a selection unit configured to select a content associated with the predetermined location for output thereat based on the attribute information received by the reception unit in response to the determination by the determination unit that the location information indicates the predetermined location; and
- an instruction unit configured to cause outputting the content selected by the selection unit.

* * * * *